US009438506B2

(12) United States Patent
Ryland

(10) Patent No.: US 9,438,506 B2
(45) Date of Patent: Sep. 6, 2016

(54) IDENTITY AND ACCESS MANAGEMENT-BASED ACCESS CONTROL IN VIRTUAL NETWORKS

(71) Applicant: Amazon Technologies, Inc., Reno, NV (US)

(72) Inventor: Mark Ryland, Great Falls, VA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 14/103,628

(22) Filed: Dec. 11, 2013

(65) Prior Publication Data

US 2015/0163158 A1   Jun. 11, 2015

(51) Int. Cl.
| | | |
|---|---|---|
| *H04L 9/32* | (2006.01) | |
| *H04L 12/56* | (2006.01) | |
| *H04L 12/66* | (2006.01) | |
| *H04L 12/701* | (2013.01) | |
| *H04L 12/24* | (2006.01) | |
| *H04L 12/911* | (2013.01) | |

(52) U.S. Cl.
CPC ........... *H04L 45/00* (2013.01); *H04L 41/0893* (2013.01); *H04L 47/70* (2013.01)

(58) Field of Classification Search
CPC .................. H04L 47/70; H04L 41/0893
See application file for complete search history.

(56) References Cited

U.S. PATENT DOCUMENTS

| | | |
|---|---|---|
| 6,092,196 A | 7/2000 | Reiche |
| 6,460,141 B1 | 10/2002 | Olden |
| 6,986,061 B1 | 1/2006 | Kunzinger |
| 7,124,101 B1 | 10/2006 | Mikurak |
| 8,447,829 B1 | 5/2013 | Geller et al. |
| 2002/0064149 A1 | 5/2002 | Elliott et al. |
| 2002/0147810 A1 | 10/2002 | Traversat et al. |
| 2005/0273668 A1 | 12/2005 | Manning |
| 2007/0156842 A1* | 7/2007 | Vermeulen ........ G06F 17/30212 709/217 |
| 2010/0002717 A1 | 1/2010 | Fischer et al. |
| 2012/0099591 A1 | 4/2012 | Kotha et al. |

OTHER PUBLICATIONS

Amazon Elastic Compute Cloud User Guide, pp. 395-414, API Version, Oct. 15, 2013.
Amazon Elastic Compute Cloud API Reference, pp. 537-543, API Version, Oct. 15, 2013.

(Continued)

*Primary Examiner* — Larry Donaghue
(74) *Attorney, Agent, or Firm* — Robert C. Kowert; Meyertons, Hood, Kivlin, Kowert & Goetzel, P.C.

(57) ABSTRACT

Methods and apparatus for providing identity and access management-based access control for connections between entities in virtual (overlay) network environments. At the encapsulation layer of the overlay network, an out-of-band connection creation process may be leveraged to enforce access control and thus allow or deny overlay network connections between sources and targets according to policies. For example, resources may be given identities, identified resources may assume roles, and policies may be defined for the roles that include permissions regarding establishing connections to other resources. When a given resource (the source) attempts to establish a connection to another resource (the target), role(s) may be determined, policies for the role(s) may be identified, and permission(s) checked to determine if a connection from the source to the target over the overlay network is to be allowed or denied.

20 Claims, 14 Drawing Sheets

(56) References Cited

OTHER PUBLICATIONS

Information Systems Control Journal,"Identity and Access Management—Transforming E-security into a Catalyst for Competitive Advantage," Bill McQuaide, pp. 1-3, 2003.

International Search Report and Written Opinion from PCT/US2014/069825, Dated Mar. 10, 2015, Amazon Technologies, Inc, pp. 1-12.

* cited by examiner

POLICY 400A

.
.
.
{
<effect (allow/deny)>
<action(s)>          ⎫
<resource(s)>        ⎬ — permisson
<condition(s) (optional)> ⎭
}
.
.
.

FIG. 4A

POLICY 400B

.
.
.
{
<effect (allow/deny)>
<action(s)>          ⎫
<principal(s)>       ⎬ — permisson
<condition(s) (optional)> ⎭
}
.
.
.

FIG. 4B

```
POLICY 500A
.
.
.
{
<allow>
<open connection>
<resource(s)>
<condition(s):
        [port restrictions]
        [protocol(s)]
        [other property(s)]
>
}
.
.
.
{
<deny>
<open connection>
<resource(s)>
}
.
.
.
```

```
POLICY 500B
.
.
.
{
<allow>
<accept connection>
<principal(s)>
<condition(s):
        [port restrictions]
        [protocol(s)]
        [other property(s)]
>
}
.
.
.
{
<deny>
<accept connection>
<principal(s)>
}
.
.
.
```

IDENTITY AND ACCESS MANAGEMENT-BASED ACCESS CONTROL IN VIRTUAL NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private and/or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for computing hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients, as well as facilitating the provisioning, management, and movement of computing resources among a set of physical nodes. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource. As another example, a virtualized operating system can more easily be moved between physical nodes, either by stopping and starting, or even while running by copying memory pages over the network followed by a final snapshot and rerouting of network traffic using a process sometimes known as "live migration."

Altogether these trends have led to the advent of large-scale, "utility-style" (pay as you go) computing environments for multiple customers or "tenants" that, on the one hand, share resources from a large common pool of computing and storage resources while, on the other hand, having their tenant-specific resources act in a logically isolated fashion that maintains their privacy and security. Such systems are known as multi-tenanted cloud computing environments or "public clouds." In this usage, the term "public" does not mean that tenant usage is not isolated and secure. Instead, it means that members of the public may access logically isolated resources in the public clouds, and in at least some cases pay for what they use, for example on a per hour, per gigabyte, or per month basis.

BRIEF DESCRIPTION OF THE DRAWINGS

FIGS. 4A and 4B provide non-limiting examples of a general format for policies, according to at least some embodiments.

FIGS. 5A and 5B provide non-limiting examples of policies that may be defined for principals or resources, according to at least some embodiments.

DETAILED DESCRIPTION

Figure 1:
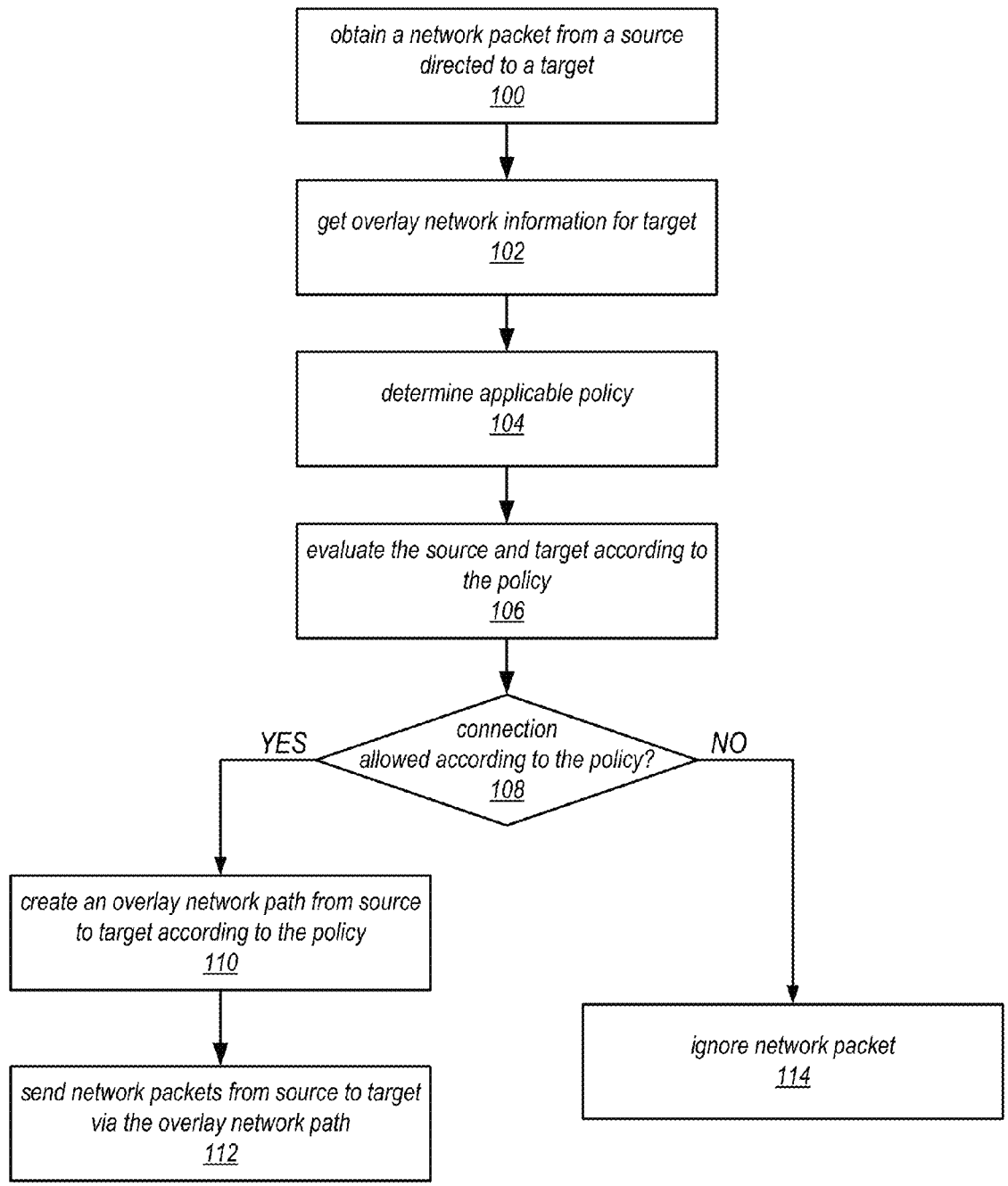
FIG. 1 is a high-level flowchart of an access control method for overlay network connections, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various embodiments of methods and apparatus for identity and access management-based access control in virtual networks are described. More specifically, embodiments of methods for providing identity and access management-based control, establishment, and management of connections between entities in overlay network environments are described. These methods may be referred to herein as identity and access management based access control methods, or simply as access control methods. An overlay network environment may, for example, use an encapsulation protocol technology over a network substrate for communications between entities. In an overlay network environment using encapsulation protocol technology over a network substrate, network packets may be generated by a network packet source (an entity that generates the network packets), wrapped or encapsulated at an encapsulation layer implemented according to the encapsulation protocol technology to produce encapsulation protocol packets (also referred to herein as encapsulation packets or network substrate packets).

The encapsulation packets may then be routed over the network substrate to a destination according to routing information for the encapsulation packets. The routing of the encapsulation packets over the network substrate according to the encapsulation information may be viewed as sending the encapsulation packets via overlay network routes or paths over the network substrate. At the destination, the encapsulation layer removes the network packets from the encapsulation packets (a process referred to as decapsulation) and provides or sends the network packets to the network packet destination (an entity that consumes the network packets).

In conventional physical network environments, a first step used by a physical node seeking to send a packet to another IP address, is to send an ARP (address resolution protocol) packet, which is a broadcast packet logically received by all hosts on a subnet. (In some implementations, a network switch may cache the results of previous broadcasts and short-circuit this process, but the logical algorithm remains the same.) The ARP packet serves as a resource discovery message, an enquiry as to which physical node is the host corresponding to the desired IP address. In a well-behaved network, one and only one host (the one responsible for that IP address) will respond with its MAC (media access control, or layer 2) address. Thereafter, the sending host caches the mapping between the MAC address and the IP address in its local ARP table. Note that there are security risks with this standard method. For example, the fact that there is no secure way to determine if the respondent to an ARP request is telling the truth is a limitation of many physical networks, and "ARP cache poisoning" is a known network security attack vector.

In an overlay network environment, the above process is mimicked in a way that is backwards compatible, but that may reduce the security risks. In at least some implementations of an overlay network, the ARP packet is not forwarded but is treated as a kind of application programming interface (API) call informing the encapsulation layer that the host wishes to communicate with another host at the given IP address. The encapsulation layer then does a lookup in a mapping service to determine if the host has the right to send packets to that destination, and if there is a corresponding potential recipient node with the requested IP address that is configured to receive from the sender. If this mapping service lookup succeeds, then the encapsulation layer returns a Virtual MAC (VMAC) address to the requesting host, and thereafter treats the IP address that was looked up as being owned by the VMAC presented back to the overlay network host. In at least some implementations, the hosts are not allowed to see or directly respond to ARP packets, thereby providing improved network security.

In the overlay network environment, from the perspective of the network packet source and the network packet destination, it appears as if the two entities are connected via a physical network that forwards network packets in a conventional way. However, in reality, the network packets from the network packet source are encapsulated and sent over the network substrate for routing to the network packet destination, with a potentially different addressing scheme, routing scheme, protocols, and so on used in the overlay network environment to deliver the packets via the network substrate.

Each encapsulation packet may include one, two, or more network packets. In various embodiments, the encapsulation protocol may be a standard network protocol such as IPv6 (Internet Protocol version 6) or User Datagram Protocol (UDP), or alternatively may be a non-standard, custom, or proprietary network protocol. The network packets that are encapsulated according to the encapsulation protocol may, for example, be Internet Protocol (IP) technology packets including but not limited to IPv4 (Internet Protocol version 4) packets, IPv6 packets, Transmission Control Protocol (TCP) packets, User Datagram Protocol (UDP) packets, or Internet Control Message Protocol (ICMP) packets. However, the network packets may be packets according to other IP protocols, other standard protocols than IP protocols (such as OSI TP4), or packets according to other non-standard, custom, or proprietary protocols (such as Novell IPX/SPX or Xerox XNS).

Conventionally, in overlay network environments, connections between entities (e.g., overlay network paths between network packet sources and network packet destinations) are established by a device and/or process at the encapsulation layer, which for simplicity may be referred to herein as an encapsulation layer process. As an example of an encapsulation layer process, the overlay network environment may include host systems each implementing an instance of a hypervisor, also referred to as a virtual machine monitor (VMM), that performs encapsulation layer functionality on behalf of one or more virtual machine instances (VMs) on the respective host system to establish packet flows (e.g., overlay network paths) to other entities according to an overlay network encapsulation protocol. As another example, an encapsulation layer process may be implemented as or on a coprocessor that intercepts some or all network packets from a network packet source and encapsulates the packets according to an encapsulation protocol for delivery over the network substrate. As yet another example, an encapsulation layer process may be implemented as or on a device situated between (from a networking perspective) a VMM and the network substrate, or situated between (from a networking perspective) an operating system on a physical hardware device and the network substrate. In general, an instance of an encapsulation layer process may be implemented anywhere between a network packet source or destination and the network substrate to handle encapsulation/decapsulation of the network packets according to the encapsulation protocol technology of the overlay network.

Generally, establishing a packet flow between two entities on an overlay network may involve the VMM receiving a network packet from a local VM, accessing a mapping service or utility (or a local cache of mapping information) to determine mapping information (e.g., overlay address to substrate address mapping) to a target (which may be, but is not necessarily, another VM on the network), encapsulating the network packet(s) according to the mapping information, and sending the encapsulation packets onto the network substrate to be routed to the target according to the encapsulation information.

Conventionally, the encapsulation layer may implement a simple network IP address access control method. For example, in response to a query (e.g., an ARP query) by the source VMM, if the mapping service has a valid target address and if the source address is allowed to send packets to that target address, then the target address (e.g., VMAC address) is returned to the VMM, the VMM encapsulates the network packet(s) according to the target address and sends the encapsulation packets onto the substrate network for routing to the target. In some implementations, an overlay network may allow basic access rules to be written that involve groups of source and target systems, and that may provide, at the network layer, only a rough notion of "identity." For example, a basic access rule may allow one or more servers in a group A to send packets to one or more servers in a group B using the TCP protocol and port 80. However, conventionally, the encapsulation layer does not enforce more general identity and access management based policies present in the surrounding security system and network environment (e.g., a provider network environment) when establishing connections between networking entities.

The process of establishing an overlay network path or connection between entities at the encapsulation layer as described above may be viewed as an out-of-band connection creation process. The source and target entities (which may be, but are not necessarily, a source VM and a destination VM on a provider network) are not aware of the overlay network or of the overlay network connections provided by the encapsulation layer. This out-of-band connection creation process at the encapsulation layer may be leveraged to enable the implementation of identity and access management based access control methods and apparatus at the encapsulation layer. In embodiments, identities can be established and policies can be defined for entities (principals and/or resources) on a network (e.g., for VMs on a provider network, or operating systems principals within a VM) at the encapsulation layer. The policies may be enforced at the encapsulation layer (e.g., by VMMs or other encapsulation layer processes) according to the identities when evaluating and establishing connections between entities on the network.

Note that the source and target entities may communicate via connection-oriented protocols such as TCP or via connectionless protocols such as UDP or ICMP. In either case, the encapsulation layer may generally perform an out-of-band connection setup in which it may be determined that the source entity may send network packets to the target entity. Thus, even for connectionless protocols, the encapsulation layer may establish an overlay network "connection" or path between two entities. Thus, in embodiments, the encapsulation layer, during the out-of-band connection setup for both connection-oriented and connectionless network protocols, may include evaluation of identity and access management policies for principals and resources as part of a decision as to whether to allow or deny network communications across the overlay network between the two entities.

In at least some embodiments, a VMM on a host system is aware of the private IP addresses of the VMs (resource instances) on the respective host system. In at least some embodiments, identities for the resource instances (or other resource identifiers as described below) may be associated with the private IP address information so that the VMMs are also aware of or can discover the identities of the logically local or private resource instances.

Note that private IP addresses, as used herein, refer to the internal network addresses of resource instances in the provider network. Network traffic originating outside the provider network is not directly routed to private IP addresses; instead, the traffic uses public IP addresses that are mapped to private IP addresses of the resource instances. Public IP addresses, as used herein, are Internet routable network addresses of the provider network that are assigned to resource instances on the provider network, either by the service provider or by the client. Traffic routed to a public IP address of the provider network may be translated, for example via 1:1 network address translation (NAT), and forwarded to a respective private IP address of a resource instance on the provider network. Note that a given private IP address as used herein is not necessarily mapped to a public IP address.

Private IP addresses as used herein may generally be, but are not necessarily, non-Internet routable IP addresses (e.g., RFC 1918 addresses) that are, for example, only routable within the provider network or a subnetwork thereof, or within a client's virtual private network implementation on the provider network. However, in some implementations, the private IP addresses may themselves be Internet routable addresses. In other words, a client may use Internet routable addresses or non-routable addresses for the client's resource instances on the provider network and within the client's virtual private network implementation on the provider network. In at least some embodiments, a client may control the access and addressing of resource instances within the client's virtual private network by assigning private IP addresses to particular resource instances according to the client's private addressing scheme used on the private network and/or by mapping or remapping public IP addresses (assigned to the client by the service provider) to the client's private IP addresses or ranges thereof. Note that at least some private IP addresses of resource instances in a given virtual private network are not necessarily mapped to public IP addresses.

FIG. 1 is a high-level flowchart of an access control method for overlay network connections, according to at least some embodiments. The method may, for example, be performed by a process or processes at the encapsulation layer of the network, for example by a virtual machine monitor (VMM) on a host system that performs encapsulation layer functionality on behalf of one or more virtual machine instances (VMs) on the host system to establish packet flows (e.g., overlay network paths) to other entities according to an overlay network encapsulation protocol.

As indicated at 100, an encapsulation layer process (e.g., a VMM) obtains a network packet from a source (e.g., a VM on the host system). The network packet may indicate a target; for example, the packet may include a target address (e.g., an IP address of a client resource instance). As indicated at 102, the encapsulation layer process may obtain overlay network mapping information for the target. In at least some embodiments, the overlay network information may include at least an IP address of an encapsulation layer destination for the packet on the substrate network (e.g., a VMM that fronts the target VM). In at least some embodiments, the encapsulation layer process may access a mapping service to obtain the mapping information. However, in some embodiments, the mapping information for the target, once obtained from a mapping service, may thereafter be obtained from a local cache. An example mapping service is further described below, for example in reference to FIGS. 2 and 10.

As indicated at 104, applicable policy may be determined according to the identities of the source and/or target. As indicated at 106, the source and target may be evaluated according to the policy to determine if a connection from the source to the target is allowed. In at least some embodiments, elements 104 and 106 may be performed by an access control service on the network. In at least some embodiments, the encapsulation layer process communicates with the access control service via an application programming interface (API) to the service to perform elements 104 and 106.

At 108, if a connection from the source to the target is allowed according to the policy, then a connection (e.g., an overlay network path) may be created from the source to the target according to the policy as indicated at 110, and network packets may be sent from the source to the target via the overlay network path as indicated at 112. In some embodiments, creating an overlay network path is performed by encapsulating the network packets according to an encapsulation protocol of the overlay network in which the encapsulation metadata includes information for routing the packet to an overlay network destination at the encapsulation layer, for example another VMM on the provider network. At the encapsulation layer destination, the encapsulation is removed from the network packet and the original network packet is delivered to the target (e.g., a VM on the respective host system).

At 108, if a connection from the source to the target is not allowed according to the policy, then the network packet may be ignored and discarded by the encapsulation layer process as indicated at 114. In some embodiments, the encapsulation layer process (e.g., a VMM) does not notify the source (e.g., a source VM on the respective host system) that the connection was not allowed. In some embodiments, the encapsulation layer process may log or record connection requests that are not allowed for reporting purposes, for example to be reported to a client or customer that owns the respective VMs. However, in some embodiments, the encapsulation layer process may notify the source that the connection was not allowed. For example, a logical out-of-band security protocol such as Generic Security Service Application Program Interface (GSSAPI, also GSS-API) may be utilized by the VMM to inform the source VM of an "access denied" message in a way that does not break compatibility with existing security protocols utilized by the VM and its operating system.

In at least some embodiments, elements 102 through 108 may only be performed for a first network packet in a given packet flow between a source and a target. Subsequent network packets in the given packet flow or logical connection may be sent to the target via the overlay network encapsulation protocol as indicated at 112 without evaluating the policy for each network packet.

Figure 2:
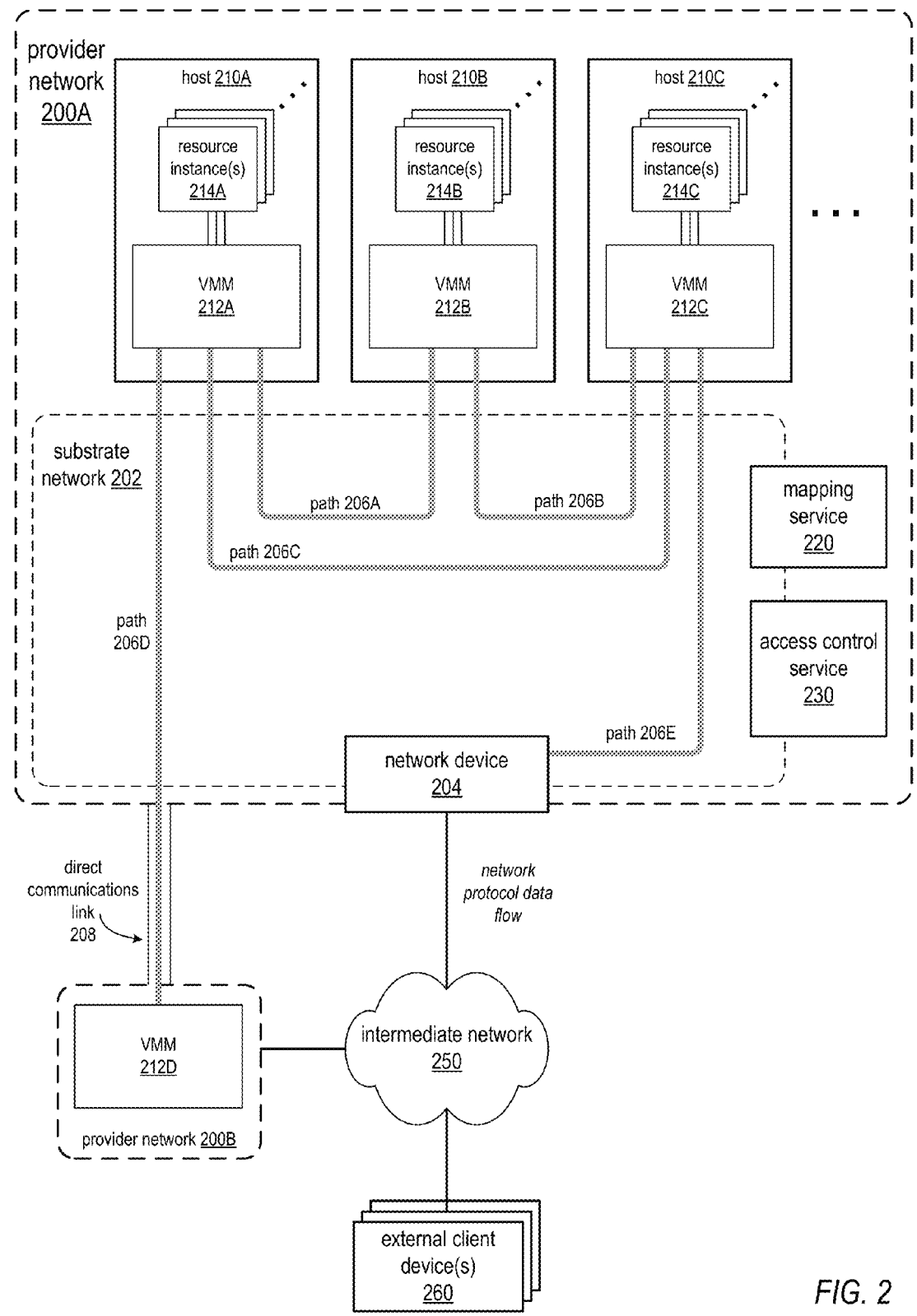
FIG. 2 illustrates an example provider network environment in which embodiments of the methods and apparatus for access control may be implemented.
Figure 10:
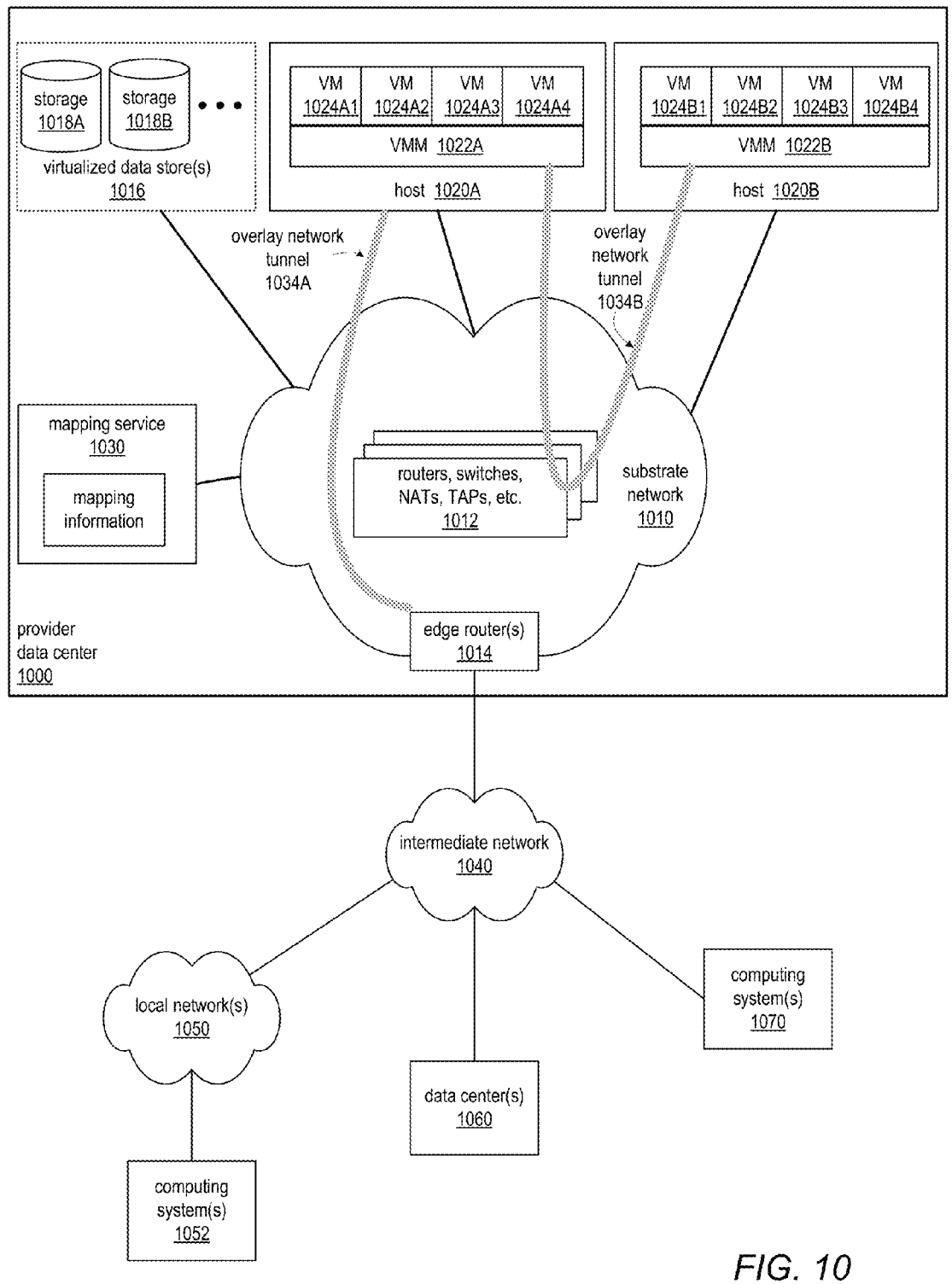
FIG. 10 illustrates an example data center that implements an overlay network on a network substrate using IP tunneling technology, according to some embodiments.
Figure 11:
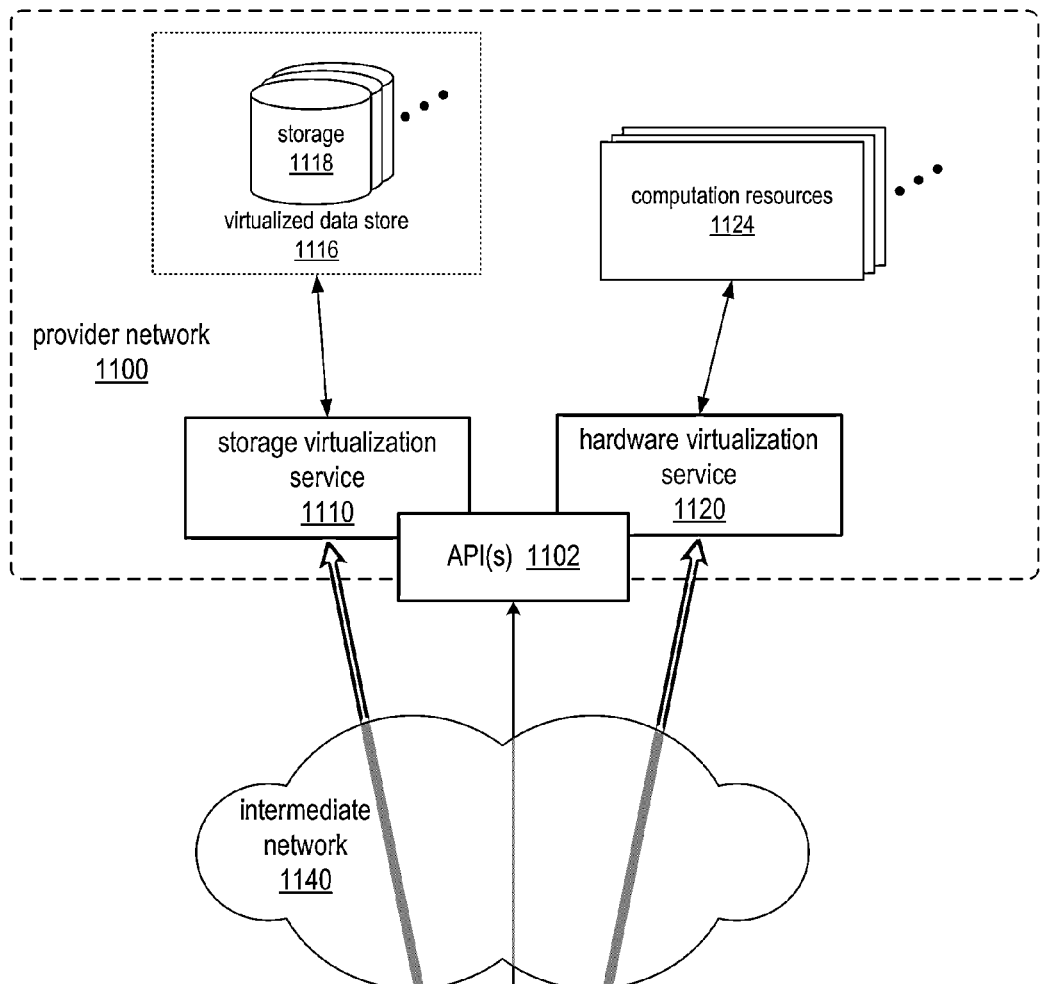
FIG. 11 is a block diagram of an example provider network that provides a storage virtualization service and a hardware virtualization service to clients, according to at least some embodiments.
Figure 11:
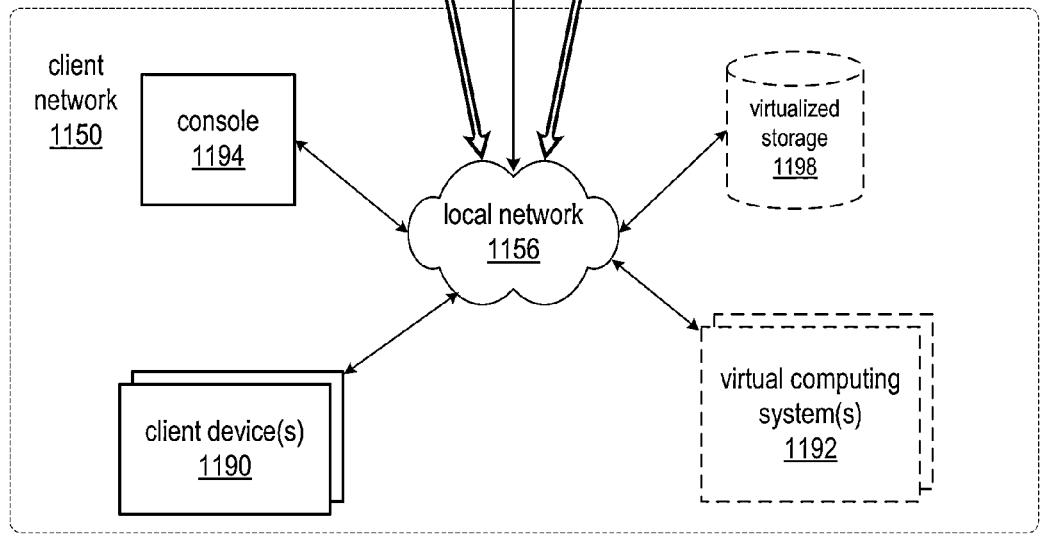
Figure 12:
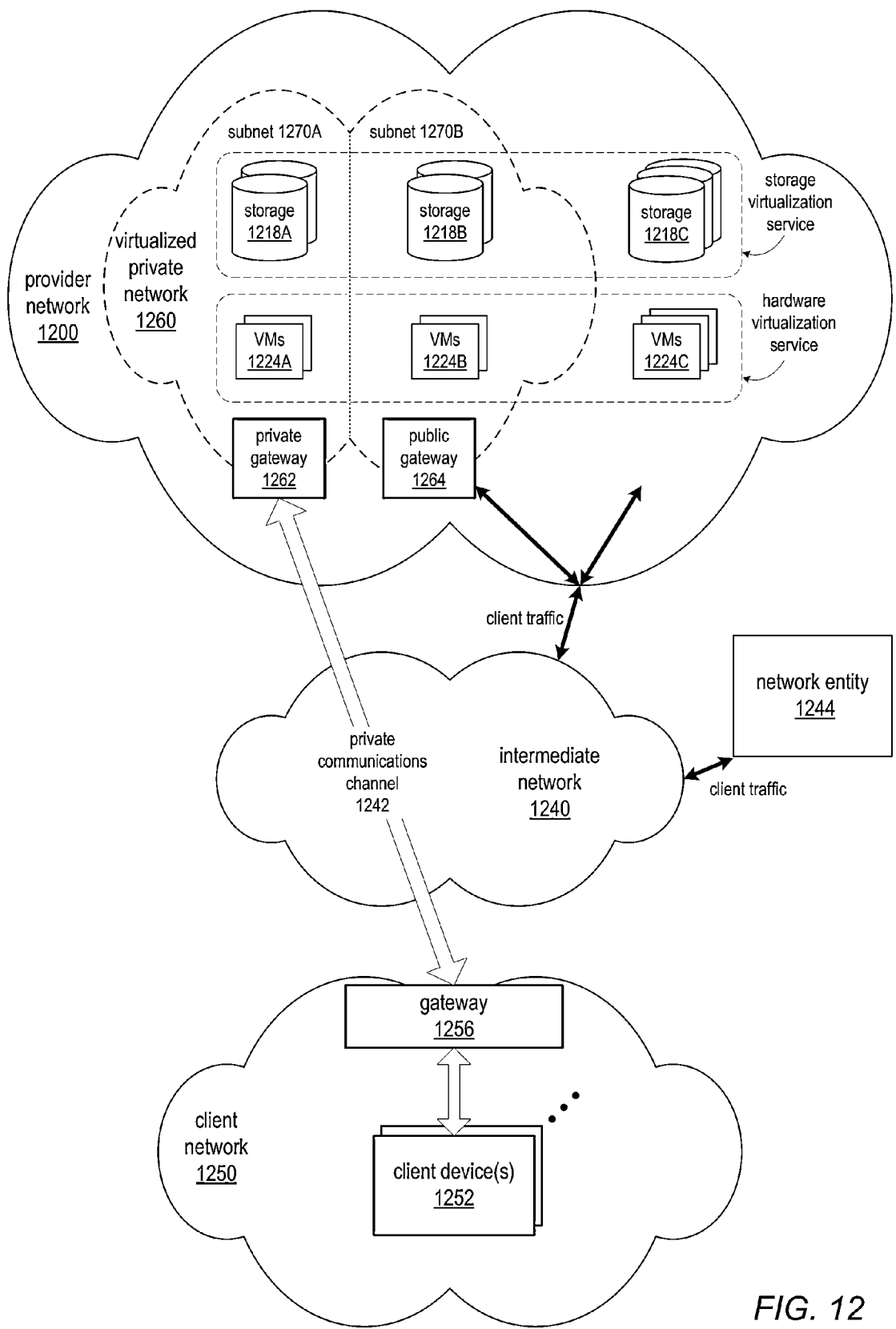
FIG. 12 illustrates an example provider network that provides virtual private networks to at least some clients, according to at least some embodiments.
Figure 13:
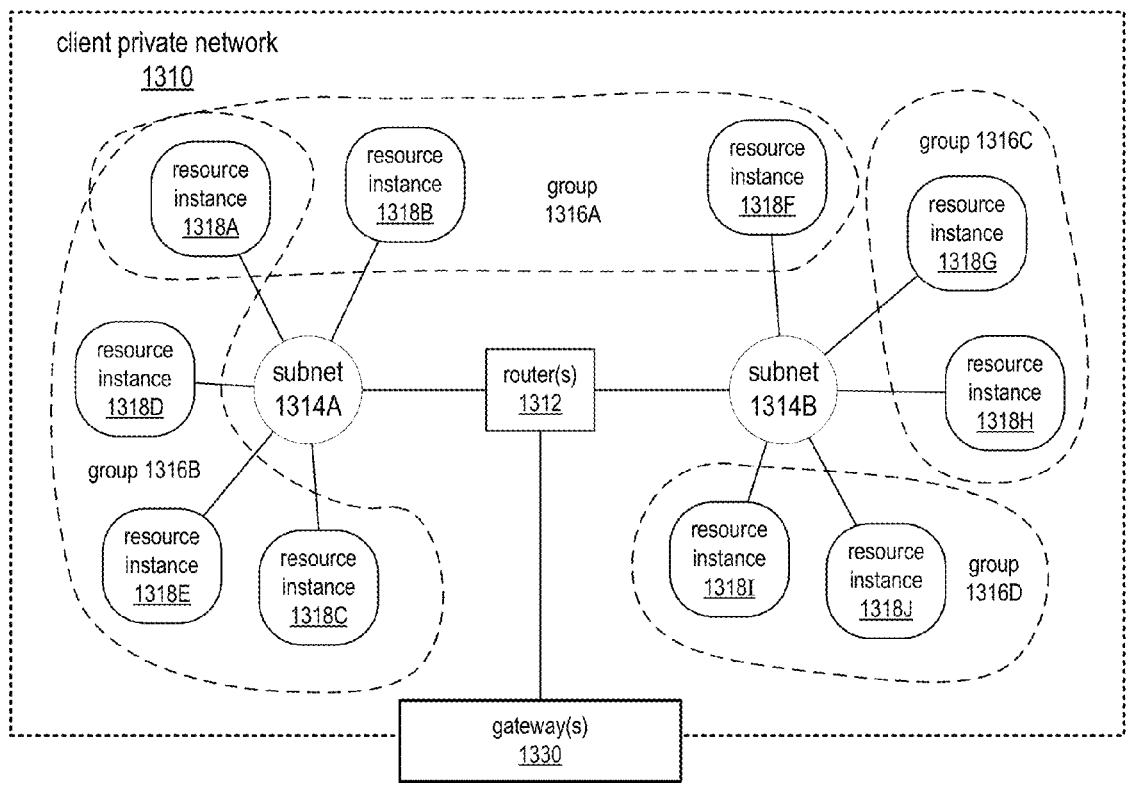
FIG. 13 illustrates subnets and groups in an example virtual private network implementation on a provider network, according to at least some embodiments.

Embodiments of the methods and apparatus for access control in virtual networks may, for example, be implemented in the context of a service provider that provides to clients or customers, via an intermediate network such as the Internet, virtualized resources (e.g., virtualized computing and storage resources) implemented on a provider network 200 of a service provider, as illustrated in FIG. 2. FIGS. 9 through 13 and the section titled Example provider network environments further illustrate and describe example service provider network environments in which embodiments of the methods and apparatus as described herein may be implemented. Referring to FIG. 2, in at least some embodiments, at least some of the resources provided to clients of the service provider via a provider network 200A may be virtualized computing resources implemented on multi-tenant hardware that is shared with other client(s) and/or on hardware dedicated to the particular client. Each virtualized computing resource may be referred to as a resource instance 214. Resource instances 214 may, for example, be rented or leased to clients (or tenants) of the service provider. For example, clients of the service provider, via external client device(s) 260 coupled to the provider network 200A via an intermediate network 250 such as the Internet, may access one or more services of the provider network 200A via APIs to the services to obtain and configure resource instances 214 and to establish and manage virtual network configurations that include the resource instances 214, for example clients' virtual private networks as illustrated in FIGS. 12 and 13.

As shown in FIG. 2, in some implementations, the service provider may have two or more provider networks 200 (provider networks 200A and 200B are shown), which may be but are not necessarily implemented in different, possibly geographically distant, data centers. Two provider networks 200 may, for example, be coupled by one or more direct communications links 208, for example fiber optic connections. Instead or in addition, two provider networks 200 may communicate over the intermediate network 250.

At least some of the resource instances 214 may, for example, be implemented according to hardware virtualization technology that enables multiple operating systems to run concurrently on a host 210 computer, i.e. as virtual machines (VMs) on the hosts 210. A hypervisor, or virtual machine monitor (VMM) 212, on a host 210 presents the VMs 214 on the host 210 with a virtual platform and monitors the execution of the VMs 210. Each VM 214 may be provided with one or more private IP addresses; the VMM 212 on a respective host 210 may be aware of the private IP addresses of the VMs 214 on the host 210. For further information on hardware virtualization technology, see FIGS. 9 through 13.

The provider network 200A may include a network substrate 202 that includes networking devices such as routers, switches, network address translators (NATs), and so on, as well as the physical connections among the devices. The VMMs 212, along with other devices and processes on the network substrate 202, may enable the creation of an overlay network, which may also be referred to as a software defined network or SDN, on the provider network 200. Creation and management of the overlay network may be performed via the control plane of the provider network 200, for example via calls to one or more APIs of services or other process at the control plane. In at least some embodiments, the VMMs 212 and other devices or processes may use encapsulation protocol technology to encapsulate and route network packets (e.g., client IP packets) over the network substrate 202 between client resource instances 214 on different hosts 210 within the provider network 200A, to other devices or subnetworks on the provider network such as network device 204, or to other devices or client resource instances on other provider networks 200. The encapsulation protocol technology may be used on network substrate 202 to route encapsulated packets (network substrate packets) between endpoints on the network substrate 202 or to endpoints on other provider networks 200 via paths 206 or routes. The encapsulation protocol technology may be viewed as providing a virtual network topology, with potentially a different addressing and subnetting scheme, overlaid on the network substrate 202; thus the term "overlay network." In at least some embodiments, the encapsulation protocol technology may include a mapping service 220 that maintains a mapping directory that maps IP overlay addresses (IP addresses as utilized by the clients or customers of the provider network 200, which may be isolated from the topologies of other clients or customers on the provider network 200) to substrate IP addresses (IP addresses utilized by the underlying networking infrastructure that are not generally exposed to clients or customers of the provider network 200) and that may be accessed by various processes on the provider network 200 for routing packets between endpoints on the network substrate 202. For an example implementation of and further information about a virtual network technology that uses an encapsulation protocol to implement an overlay network on a network substrate, see FIGS. 9 through 13.

Client resource instances 214 on a host 210 may communicate with other client resource instances 214 on the same host 210 or on different hosts 210 according to connection-oriented protocols such as Transmission Control Protocol (TCP) and/or according to connectionless protocols such as User Datagram Protocol (UDP) or Internet Control Message Protocol (ICMP). However, the client packets are encapsulated according to an encapsulation protocol by the sending VMM 212, sent over the network substrate 202 as network substrate packets according to the encapsulation protocol, and de-encapsulated by the receiving VMM 212. In at least some embodiments, the encapsulation protocol used on the network substrate 202 may be a connectionless protocol. However, the encapsulation protocol may be a connection-oriented protocol in some embodiments. VMM 212 on a host 210, upon receiving a client packet (e.g., a TCP or UDP packet) from a client resource instance 214 on the host 210 and targeted at a network address of another client resource instance 214, encapsulates or tags the client packet according to the encapsulation protocol and sends the network substrate packet (which may also be referred to herein as an encapsulation packet) onto the network substrate 202 for delivery. The network substrate packet may then be routed to another VMM 212 via the network substrate 202 according to information in the encapsulation protocol packet header. The other VMM 212 strips the encapsulation data from the client packet and delivers the client packet (e.g., a TCP or UDP packet) to the appropriate VM on the host 210 that implements the target resource instance 214. Note that in some implementations, two or more client packets may be encapsulated in a single network substrate packet to increase efficiency or for other reasons. Generally, the two or more client packets may be directed to the same target (e.g., to the same resource instance 214). However, in some implementations, two or more client packets directed to different targets (e.g., different resource instances 214) may be encapsulated together in a single network substrate packet as long as the network substrate 202 target address (e.g., a VMM 212 on a particular host 210) for the client packets is the same.

In at least some embodiments, a VMM 212, upon receiving a network packet directed to a target from a resource instance 214 on the respective host 210, accesses a mapping service 220 of the provider network 200 that maps IP overlay addresses to substrate IP addresses for routing the network packet to an appropriate endpoint on the network substrate 202. For example, the target may be another resource instance 214, and the endpoint may be another VMM 212 on the network substrate 202 that hosts the target resource instance. As another example, the target may be an external device 260, and the endpoint may be a network device 204.

In embodiments of the methods and apparatus for access control in virtual networks, in addition to accessing the mapping service 220 to determine an IP overlay address for the target, the VMM 212 may also communicate with an access control service 230 of the provider network 200 to determine if there is a policy or policies associated with the source resource instance 214 and/or with the target of the network packet and, if so, determine if the policy(s) allows or disallows a connection from the source resource instance 214 to the target. The VMM 212 only completes the connection if the access control service 230 indicates that the connection is allowed. In at least some embodiments, a policy may also specify one or more conditions for a connection, for example allowed port numbers for connections to a target and/or allowed network protocols for communicating with a target. As another example, in at least some embodiments, clients may define arbitrary metadata tags and associate the metadata tags with particular resource instances 214. As an example of using these metadata tags in policies, a condition of a policy may be specified that only allows network traffic between two resource instances 214 that both have the same metadata tag. For example, a policy may specify that network traffic will only be allowed if both resource instances have the tag "Accounting Department."

In at least some embodiments, completing the connection involves the VMM 212 encapsulating the network packet and sending the encapsulation packet onto the network substrate 202, and thus establishing a path 206 over the network substrate 202 between the source resource instance 214 and the target. If the access control service 230 indicates that the connection is not allowed, the VMM 212 does not complete a connection from the source to the target. In other words, the VMM 212 does not encapsulate the network packet and send the encapsulation packet onto the network substrate 202, and thus no path 206 is established over the network substrate 202 between the source resource instance 214 and the target. Note that, in some embodiments, the functionalities of the mapping service 220 and the access control service 230 may be combined in a single service on the provider network 200.

In at least some embodiments, identities (which may be referred to as principals) may be assigned to or otherwise associated with resource instances 214, and the principals may be used in identifying and enforcing policies for the resource instances 214. A principal may, for example, be a user, group, role, or other entity in an identity and access management system or environment. In other words, there may be different types of principals, including but not limited to user, group, and role principal types. In at least some embodiments, in addition to assigning principals to resource instances 214 and using the principals in policy identification and enforcement, other properties or conditions of resource instances 214, such as the name of an instance within a hierarchical namespace, user-defined metadata tags, IP addresses, account identifiers, and so on, may be used to identify resource instances 214, identify policies for resource instances, and enforce the identified policies. Collectively, these various methods that may be used to identify resource instances 214 (e.g., principals, names, metadata tags, account identifiers, IP addresses, etc.) may be referred to as resource identifiers.

Thus, generalizing, various types of resource identifiers that are associated with resource instances 214 may be used to identify and enforce policies for the resource instances 214. As a particular example, in at least some embodiments, at least some policies enforced by the access control service 230 may be defined for and associated with roles that resource instances 214 may assume (note that a role may be a type of principal in an identity and access management environment) rather than with the individual resource instances 214. In at least some embodiments, a client may define one or more roles for resource instances 214 in the client's virtual private network implementation on the provider network 200, and define policies for each of the one or more roles. One or more of the client's resource instances 214 may then assume a role or roles.

While the "role" principal type is generally used hereinafter as an example in describing embodiments of the methods and apparatus for access control in virtual networks, it is to be noted that the methods and apparatus for access control as described herein may be applied with other types of principals (e.g., users, groups, etc.) and/or to other types of resource identifiers (names, metadata tags, account identifiers, IP addresses, etc.).

A policy for a role may, for example, indicate one or more other network groups or entities to which a resource instance 214 in that role may initiate communications. For example, a policy for a role may indicate one or more subnets on the provider network 200 to which a client's resource instances 214 that assume that role may initiate communications, each subnet including one or more other resource instances 214 of the respective client. For more information on subnets in a provider network see FIGS. 12 and 13. Alternatively, a policy for a role may indicate one or more other network groups or entities to which a resource instance 214 in the role may not initiate communications. A policy for a role may also indicate one or more other network groups or entities that are not allowed to initiate communications with resource instances 214 in the role. In at least some embodiments, a policy may also specify one or more conditions for a connection, for example allowed port numbers for connections from resource instances in a role to a target and/or allowed network protocols for the connections. As another example, metadata tags associated with resource instances 214 may be used in conditions of a policy. As an example of using these metadata tags in policies, a condition of a policy may be specified that only allows network traffic between two resource instances 214 that both have the same metadata tag. FIGS. 4A and 4B provide non-limiting examples of a general format for policies. FIGS. 5A and 5B provide non-limiting examples of policies that may be used in at least some embodiments.

In at least some embodiments, the VMM 212, in addition to being aware of the private IP addresses of the resource instances 214 on the host 210, may also be aware of or be able to discover roles to which the resource instances 214 on the host 210 have assumed. Upon determining a role that the resource instance 214 has assumed, the VMM 212 may communicate with the access control service 230 to determine if there is a policy associated with the role and, if so, if a connection is allowed to the target indicated by the network packet. If there is a policy associated with the role, then the access control service 230 may evaluate the policy to determine if a connection is allowed from the source resource instance 214 to the target and inform the VMM 212 as to whether the connection is or is not allowed.

In at least some embodiments, a target may also be associated with a role. For example, the target may be another of the client's resource instances 214 on a different host 210 and thus fronted by a different VMM 212, and the client may have defined a role with a policy, and the target resource instance 214 may have assumed the role. In at least some embodiments, in addition to evaluating the policy for the role that the source resource instance 214 has assumed to determine if a connection from the source to a target is allowed, the policy of a role which the target has assumed may also be evaluated to determine if the connection from the source to the target is to be allowed. For example, if the policy associated with the target's role indicates that connections are not allowed to resource instances in the role from a subnet on which the source resource instance 214 is located, then a connection from the source to the target is not allowed even if the policy associated with the source indicates that a connection to the target would be allowed. As another example, the policy of the target's role may indicate that connections are allowed from (or not allowed from) resource instances in particular other roles. In other words, and stated more generally, if there are policies associated with both the source and the target, then both policies must be in agreement before a connection is allowed.

While the above generally describes providing access control between a source resource instance 214 of a client and another resource instance 214 of the client within a virtual private network of the client on a provider network 200 over the network substrate 202, note that embodiments may be used to provide access control between a source resource instance 214 of a client on one provider network 200A when trying to connect to a resource of the client on another provider network 200B via a direct communications link 208.

In addition, at least some embodiments of the access control methods may provide mechanisms for controlling access from sources that are outside a client's virtual private network implementation on the provider network 200 to resource instances within the client's virtual private network. For example, referring to FIG. 2, an external client device 260 may want to send network packets to a client's resource instance 214 (the target) on the provider network 210. The external device 260's network packet(s) may be received at a network device 204 coupled to network substrate 202. In at least some embodiments, the external device 260 and the network device 204 may utilize an in-band network security protocol to establish an identity for the external device 260 on the provider network 200. For example, in at least some embodiments, a network protocol according to Generic Security Service Application Program Interface (GSSAPI, also GSS-API) may be used to establish a secure identity (i.e., a principal) associated with the external device 260 on the provider network 200. The network device 204 may then use the external device 260's established identity and/or the identity of the target (a resource instance 214) to evaluate policy for a connection between the external device 260 and the target over the overlay network. If the connection is not allowed according to policy, then the network packets may be dropped. If the connection is allowed, then the network device 204 may encapsulate the network packets according to the encapsulation protocol and send the encapsulation packets onto the network substrate 202 for delivery to the target resource instance 214 via its VMM 212.

As an example, an external device 260 may establish an identity with network device 204 and send a network packet directed to a particular resource instance 214 (or to a range of addresses for a client's resource instances). After establishing that the address(es) are valid via the mapping service 220, the network device 204 may communicate with access control service 230 to determine if there is a policy associated with the resource instance(s) 214. If there is a policy, then the policy may be evaluated to determine if the external device 260 (the source) has permission to communicate with the internal resource instance(s) 214 (the target). For example, a policy associated with the target resource instance(s) (or with a role which the resource instance(s) have assumed) may allow access to the resource instance(s) (or to resource instance(s) in the role) from certain IP addresses, from certain ranges of IP addresses, and/or from certain principals as established via a network protocol such as GSSAPI. Instead or in addition, the policy may disallow access from certain, principals, IP addresses and/or range(s) of IP addresses. If the policy allows the access, then a connection from the network device 204 to the target resource instance(s) 214 (i.e., an overlay network path such as path 206E in FIG. 2) may be established.

In addition, at least some embodiments of the access control methods may provide similar mechanisms for controlling accesses initiated from resource instances 214 within a client's virtual private network to targets that are outside the client's virtual private network using policies that are associated with the client's resource instances 214 or with roles which the client's resource instances 214 have assumed. In addition, policies associated with the targets may be evaluated when determining whether to allow a connection from within the client's virtual private network to targets outside the client's virtual private network. A target outside the client's virtual private network may, for example, be an external client device 260, a resource instance 214 on another virtual private network of the client or of another client, or a network device 204 or some other device on the provider network 200.

Access Control Service

Figure 3:
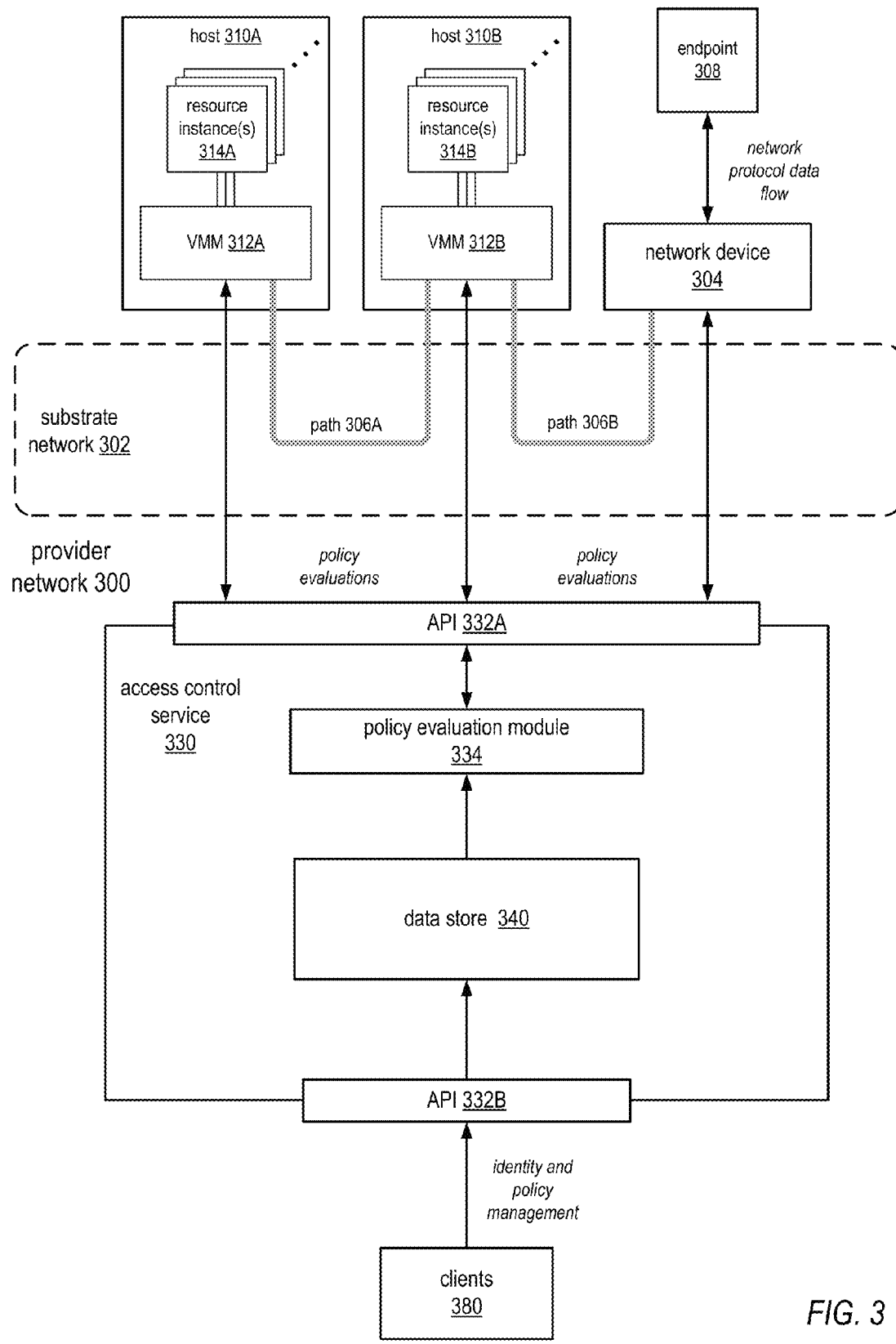
FIG. 3 illustrates an access control service on a provider network, according to at least some embodiments.
Figure 14:
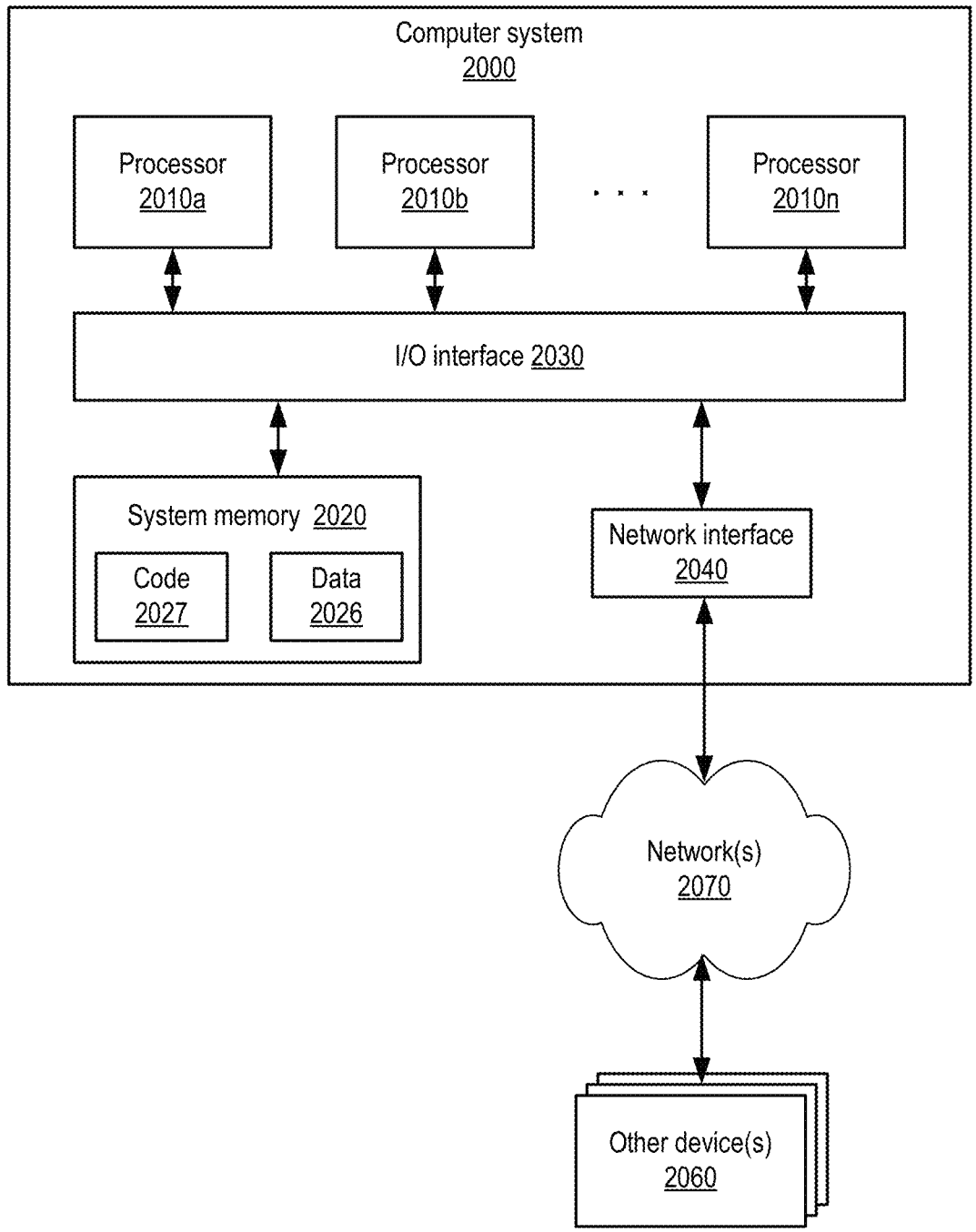
FIG. 14 is a block diagram illustrating an example computer system that may be used in some embodiments.

FIG. 3 illustrates an access control service 330 on a provider network 300, according to at least some embodiments. In at least some embodiments, identity and policy management and enforcement for access control on a network may be provided at least in part by an access control service 330. The access control service 330 may be implemented on or by one or more computing systems within a network environment, for example as a service in a service provider's provider network environment as illustrated in FIG. 2. An example computer system on which embodiments of the access control service 330 may be implemented is illustrated in FIG. 14. The access control service 330 may provide one or more application programming interfaces (APIs) 332 for accessing functionality of the service 330. However, note that the functionality described herein for the access control service 330 may instead be performed by two or more separate services. In addition, at least part of the functionality of the access control service 330 may be integrated with another service on the network, for example with a mapping service 220 as described elsewhere herein. In some embodiments, the access control service 330 may implemented as a set of cooperating software modules distributed across other nodes in the network that communicate with each other to provide a logically unified service 330; in other words, the service 330 may be implemented as distributed system.

In at least some embodiments, as shown in FIG. 3, an access control service 330 may include a data store 340 for storing clients' access control information used by the service 330, for example information related to clients' principals, roles, and policies associated with the clients' resource instances 314. The access control service 330 may provide an API 332B that allows clients 380 to view, create, modify, delete, and otherwise manage the clients' information on data store 340. The access control service 330 may also provide an API 332A that allows processes or devices (e.g., VMMs 312 on hosts 310, network device(s) 304, other services, etc.) to request policy evaluations for actions initiated by a client's named entities on the provider network 300, for example for connection requests to target entities initiated by a client's resource instances 314. The access control service 330 may include a policy evaluation module 334 that receives policy evaluation requests via API 332A, evaluates the requests according to relevant access control information on data store 340, and responds to the initiator of the request (e.g., to a VMM 312 or other process or device on the provider network 300) with results of the policy evaluation.

As previously described resource identifiers may be associated with resource instances 314 and may be used by the access control service in identifying and enforcing policies for the resource instances 314. A resource identifier may, for example, be a principal, a resource name, a metadata tag, an account identifier, an IP address, or in general any property or condition of resource instances 314. A principal may, for example, be a user, group, role, or other entity in an identity and access management environment. Policies may be associated with resource instances 314 according to one or more of the resource identifiers. In at least some embodiments, policies may be associated with individual resource instances 314 according to unique attributes or identifiers such as name-based resource identifiers or user identities according to the user principal type.

In at least some embodiments, a name-based resource identifier may uniquely identify a resource within a namespace. The following is a non-limiting example of a general format for a name-based resource identifier that may be used in at least some embodiments:

<namespace>:<owner>:<resource type>:<resource name> where:

<namespace> may identify a service that provides this resource instance on the provider network 300. For example, for VMs or resource instances 314 as described herein, the service may be a hardware virtualization service, for example a service 1120 as shown in FIG. 11.

<owner> may identify a customer or client of the service provider that "owns" this resource instance.

<resource type> may be used to distinguish between different types of resources that may be offered by a service (i.e., within a namespace).

<resource name> may, for example, be an alphanumeric string specified by the customer/client for this particular resource. In some embodiments, a resource name may be a path. The resource name should be unique within the space defined by the other elements of the name-based resource identifier.

In at least some embodiments, instead of or in addition to associating policies with individual resource instances 314 via unique attributes or identifiers such as name-based resource identifiers, policies may be associated with groups, collections, or categories that may include two or more entities (e.g., resource instances 314). As previously mentioned, principals may include a group principal type and a role principal type. As used herein, a group is a relatively static collection of resources or principals (e.g., resource instances 314); a client or other entity defines a group, and may explicitly assign members (e.g., resources or principals) to the group (or remove members from the group), or alternatively may explicitly define group membership. In at least some embodiments, at least some of the policies enforced by the access control service 330 may be defined for and associated with groups rather than with individual resources or other principal types. In at least some embodiments, defining a group may involve creating and maintaining two policies—one policy that identifies which entities (resources or principals) are in the group, and another policy that specifies permissions associated with this group. However, groups may be defined in other ways.

In at least some embodiments, the access control service 330 may also allow roles to be defined for a client's resources or principals on the provider network 300, and may allow resources and principals to assume the roles. A role differs from a group in that, whereas group membership is defined by a client and is relatively static, entities (e.g., resources or principals) may dynamically assume a role. Role "membership" is not explicitly defined; instead, one or more properties or conditions may be defined for the role that may be dynamically evaluated for an entity (e.g., a principal or resource) to determine if the entity either belongs in or may assume the role. Thus, a resource instance 314, for example, may be allowed to assume a role based on a dynamic evaluation of one or more properties of the resource instance 314. In at least some embodiments, at least some of the policies enforced by the access control service 330 may be defined for and associated with roles rather than with individual resources, user or group identities, or other principal types. Thus, resources and principals may assume roles, and roles may have policies. Separating resources and principals from roles may provide flexibility and ease of management because one, two, or more trusted entities (e.g., resources or principals) may dynamically assume a role or roles based upon a dynamic evaluation of the trusted entities rather than an explicit and static assignment to a group. In at least some embodiments, defining a role may involve creating and maintaining two policies—one policy that identifies properties and conditions that are evaluated for entities to determine if the entities may assume the role, and another policy that specifies permissions associated with this role. However, roles may be defined in other ways.

FIGS. 4A and 4B provide non-limiting examples of a general format for policies. FIGS. 5A and 5B provide non-limiting examples of policies that may be used in at least some embodiments.

FIGS. 4A and 4B provide non-limiting examples of a general format for policies, according to at least some embodiments. In at least some embodiments, there are three types of entities that may be associated with a policy 400:
- The entity (e.g., principal) or resource with which this policy is associated. For example, a policy 400 may be associated with a role defined by a client, with a particular named resource instance of a client, with a subnet, with a group, or with particular users or accounts. In general, a policy may be associated with any principal or resource in an identity and access management environment and/or on a network for which access control to other resource(s) may be enforced.
- The principal(s) or resource(s) to which statement(s) in the policy apply (as specified in the <resource(s)> field of the permissions in policy 400A and in the <principal(s)> field of the permissions in policy 400B). For example, a particular statement in the policy may allow or deny access (for particular action(s)) to specified principals, resource instances, subnets, roles, groups, address ranges, services, or in general to any entity or resource on a network that may be specified and to which access control may be enforced.
- The entity(s) for which the policy is evaluated. For example, a VMM or other encapsulation layer process may request a policy evaluation on behalf of a particular resource instance that has assumed a role with which the policy is associated and that is attempting to communicate with a target (e.g., another resource instance) to which access may be controlled by policy.

A policy 400 may include one, two or more statements that each may be referred to as a permission for the entity associated with the policy (e.g., for an associated role or other principal). Each permission may specify an effect, one or more actions, and either one or more resources on which the action(s) may be performed if allowed (or not performed if denied) as shown in policy 400A, or one or more principals that may be allowed or denied permission to perform the action(s) as shown in policy 400B. A permission may also, but does not necessarily, include one or more conditions.

In policy 400A, the specified resources may indicate which resource(s) on which the action(s) may be performed if allowed (or not performed if denied). In other words, the entity (e.g., principal) or resource with which policy 400A is associated is either allowed or denied permission to perform the action(s) on the indicated resource(s). In at least some embodiments, the indicated resource(s) may be entities (e.g., principals) or resources on a provider network including but not limited to users, groups, subnets, resource instances, roles, services, and so on. In at least some embodiments, the resources may be specified by resource identifiers as described above. In at least some embodiments, wildcards may be used in a resource identifier. For example, in a name-based resource identifier, an asterisk (or other character or symbol) may be used as a wild card, as in:
<namespace>:<owner>:<resource type>:*
where the asterisk indicates that all named resources of this namespace/owner/resource type are covered by this permission statement.

In policy 400B, the specified principal(s) may indicate which principal(s) may be allowed or denied permission to perform the action(s). In other words, the indicated principal(s) are allowed or denied permission to perform the action(s) on the entity (e.g., principal) or resource with which policy 400B. In at least some embodiments, the indicated principals(s) may be users, groups, subnets, resource instances, roles, services, and so on. In at least some embodiments, the resources may be specified by resource identifiers as described above.

The specified one or more actions indicate what actions regarding the specified resource(s) or principal(s) this particular permission applies to. As an example, an action for a policy 400A may be "open connection", which (if allowed in the effect field) would allow resource instances associated with this policy 400A (e.g., by assuming a role associated with this policy) to open connections to the resource(s)

specified by this permission. As another example, an action for a policy 400B may be "accept connection", which (if allowed in the effect field) would allow connections to be accepted from principals specified by this permission for resource instance(s) associated with this policy 400B (e.g., by assuming a role associated with this policy).

The effect specifies what happens when an entity requests access according to the specified action(s). The effect for a particular permission may, for example, be "allow" or "deny". In at least some implementations, "deny" may be the default, and thus access may be denied to an entity or resource unless "allow" is specified as the effect. In at least some embodiments, "deny" overrides "allow" when evaluating a policy or policies; that is, if a particular resource or principal is granted access to an action via one permission in a policy that specifies "allow", but denied access to the action by another permission in the policy (or in another policy) that specifies "deny" for the action, then the result of the evaluation is to deny the access.

The conditions, if present, may indicate one or more additional conditions on the specified action(s). As just one example, a condition on an "open connection" action may be a particular port number to which a connection is allowed, or a particular network protocol that can (or cannot) be used on the connection. For example, a connection may only be allowed to a port N on a specified resource, and only UDP packet flows may be allowed to the specified resource. As other examples, conditions may be evaluated for other properties of a resource, such as the resource name in a global namespace, or one or more user-defined metadata tags of the resource. For example, a connection may be allowed for (or denied to) a specified resource or resources for other resources with particular resource name(s) or for other resources with particular metadata tag(s).

Using these methods for defining policies for various client resources to control access to various resources, and for specifying permissions for particular actions associated with particular resources, a client may develop complex, thorough, and selective access control for the client's resources (e.g., resources on a client's virtual private network) on a provider network. As just one example, a policy may be defined for a role or group that includes a permission that allows (or denies) particular actions to be performed for all resources that assume the role or join the group (e.g., the "open connection" action to specified resource(s)), but that denies (or allows) particular ones of the actions for particular ones of the resources.

FIGS. 5A and 5B provide non-limiting examples of policies that may be defined for principals (or other types of roles), or resources, according to at least some embodiments. Policy 500A of FIG. 5A provides a non-limiting example of a policy that may be associated with a principal, or with a role which principals may assume, and that may define permissions for the principal in regard to specified resource(s). Policy 500B of FIG. 5B provides a non-limiting example of a policy that may be associated with a resource or with a role which resources may assume, and that may define permissions for the resource(s) in regard to specified principal(s).

Policies 500A and 500B define particular permissions for principals and resources, respectively. Policy 500A includes a permission that allows "open connection" to specified resource(s) (optionally according to one or more conditions) for the principal(s) associated with policy 500A. Policy 500A may also include a permission that denies "open connection" to specified resource(s) for the principal(s) associated with policy 500A. A specified resource may, for example, be a resource instance on the provider network, a role, a subnet, or some other resource. Note that in some cases a specified resource in policy 500A may be another principal. Policy 500B includes a permission that allows "accept connection" from specified principal(s) (optionally according to one or more conditions) for the resources that are associated with policy 500B. Policy 500B may also include a permission that denies "accept connection" from specified principal(s) for the resources associated with policy 500B. A specified principal may, for example, be another resource instance, a role, a subnet, a user, or some other resource.

As previously noted, in at least some embodiments, principals and resources may assume roles, and policies may be associated with the roles. Using the example policies in FIGS. 5A and 5B, policy 500A may be associated with a role A, and policy 500B may be associated with a role B. A principal that assumes role A may be allowed to open a connection over the overlay network, or alternatively may be denied permission to open a connection, to resource(s) as specified by the permissions in policy 500A. In addition, the specified resource(s) may include (or be specified by) role(s). For example, the first (allow) permission of policy 500A may specify that principals that assume role A are allowed to open connections to all resources that assume role B, unless a particular one of the resources is indicated in the second permission of policy 500A which denies permission to open connections to specified resource(s).

In at least some embodiments, the policy associated with the source (e.g., a principal) and target (e.g., a resource) may both be evaluated when, for example, evaluating a connection request. Using example roles A and B associated with the policies in FIGS. 5A and 5B, respectively, a principal that assumes role A may be allowed to open a connection to a resource instance that assumes role B according to policy 500A for role A, but if the policy evaluation determines that policy 500B for role B denies (or does not allow) resources in role B to accept connections from principals in role A (or from a particular principal), then the connection request is denied.

The conditions as specified in policies 500A and 500B, if present, may indicate one or more additional conditions on the open connection or accept connection actions, respectively. For example, a condition on the "open connection" and/or on the "accept connection" actions may be a particular port number or port range to which a connection is allowed. As another example, a condition may be a particular network protocol that can (or cannot) be used on the connection. As other examples, conditions may be evaluated for other properties of a resource or principal, such as the resource name in a global namespace, or one or more user-defined metadata tags of the resource or principal. For example, a condition may indicate that a connection may be allowed for (or denied to) a specified resource or resources for other resources with particular resource name(s) or for other resources with particular metadata tag(s).

Figure 6:
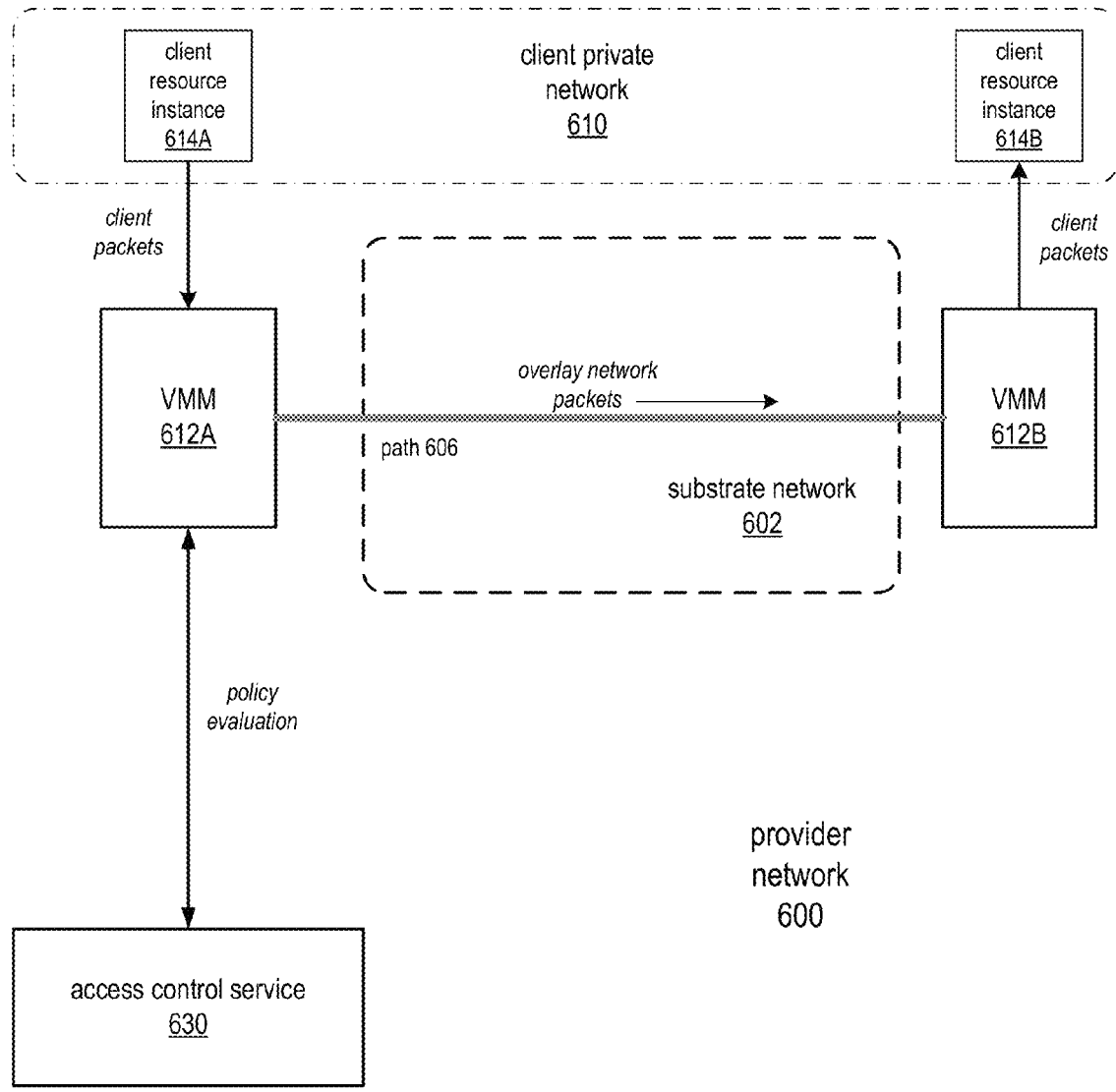
FIG. 6 is a block diagram that illustrates methods and apparatus for providing access control between resource instances on a client's virtual private network, according to at least some embodiments.

FIG. 6 is a block diagram that illustrates methods and apparatus for providing access control between resource instances on a client's virtual private network, according to at least some embodiments. A client of a service provider may access one or more services of the provider network 600 to obtain and configure resource instances 614 and to establish and manage a virtual network configuration (e.g., client virtual private network 610) that includes the client's resource instances 614. While not shown in FIG. 6, client virtual private network 610 may include subnets, and the client may establish groups within the virtual private network. A client may establish and use private IP addresses within the virtual private network 610. Private IP addresses, as used herein, refer to the internal network addresses of resource instances in the provider network 600. However, network traffic originating outside the provider network 600 is not directly routed to the private IP addresses; instead, the traffic uses public IP addresses of the provider network 600 that may be mapped to the private IP addresses, for example according to NAT technology. Note that the private IP addresses used within a virtual private network 610 may generally be, but are not necessarily, non-Internet routable IP addresses (e.g., RFC 1918 addresses) that may only be routable within the virtual private network 610. However, in some implementations, the private IP addresses used within a virtual private network 610 may be Internet routable addresses. In other words, in at least some embodiments, a client may use Internet routable addresses or non-routable addresses within the client's virtual private network 610 implementation on the provider network 600. For more information on clients' virtual private networks, groups, and subnets, see FIGS. 12 and 13.

In at least some embodiments, a client resource instance 614A on client virtual private network 610 may send a network packet addressed to another client resource instance 614B on client virtual private network 610. VMM 612A may receive the network packet and access a mapping service or utility (or a local cache of mapping information) to determine mapping information (e.g., private address to public address mapping) to the target resource instance 614B. In addition, VMM 612A may request a policy evaluation for the source and/or target of the network packet from access control service 630 to determine if client resource instance 614A is allowed to open communications with client resource instance 614B. Access control service 630 may evaluate the policy evaluation request to determine if one or both of the resource instances 614 are in roles. For example, client resource instance 614A may have assumed role A as indicated in FIG. 5A, and client resource instance 614B may have assumed role B as indicated in FIG. 5B. Once access control service 630 determines the role(s) of the resource instance(s) 614, the service 630 may evaluate the request according to the policy(s) for the role(s). If the access control service 630 determines that the policy(s) allow the connection, then the VMM 612A is notified that the connection is allowed. The VMM 612A may then open a path 606 over network substrate 602 to VMM 612B (as indicated by the mapping service) and begin to encapsulate network packet(s) from resource instance 614A and send the encapsulation packets to VMM 612B via the path 606. At VMM 612B, the network packets are de-encapsulated and delivered to client resource instance 614B. If the access control service 630 determines that the policy(s) deny the connection, in at least some embodiments, VMM 612A simply drops the network packet(s) from resource instance 614A and does not inform resource instance 614A that the connection was not allowed. However, in some embodiments, VMM 612A (or some other service on the provider network 600 such as access control service 630) may log denied connection requests (and possibly also allowed connection requests) so that a client can obtain and view information about its overlay network configuration and performance including information about connection denials according to the client's policies.

Figure 7:
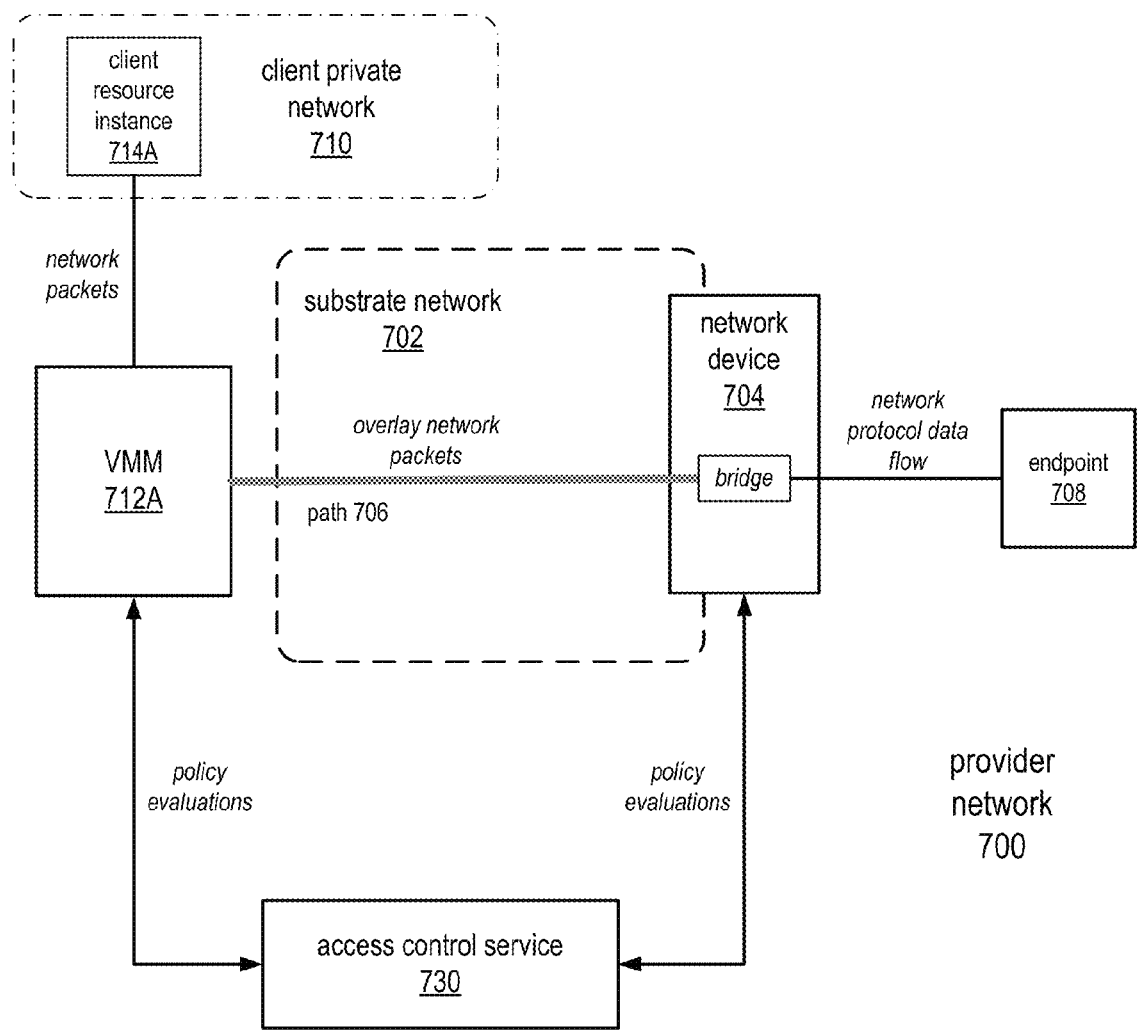
FIG. 7 is a block diagram that illustrates methods and apparatus for providing access control between a resource instance on a client's virtual private network and an external endpoint, according to at least some embodiments.

FIG. 7 is a block diagram that illustrates methods and apparatus for providing access control between a resource instance on a client's virtual private network and an external endpoint, according to at least some embodiments. A client of a service provider may access one or more services of the provider network 700 to obtain and configure resource instances 714 and to establish and manage a virtual network configuration (e.g., client virtual private network 710) that includes the client's resource instances 714. While not shown in FIG. 7, client virtual private network 710 may include subnets, and the client may establish groups within the private network. For more information on clients' virtual private networks, groups, and subnets, see FIGS. 12 and 13.

In at least some embodiments, a client resource instance 714A on client virtual private network 710 may send a network packet addressed to an endpoint 708 that is not on client virtual private network 710. The endpoint 708 may, for example, be an endpoint on provider network 700 such as a resource instance (VM) on a host machine or an endpoint on an external network. VMM 712A may receive the network packet and access a mapping service or utility (or a local cache of mapping information) to determine mapping information (e.g., private address to public address mapping) to a network device 704 on provider network 700 that serves as a bridge between endpoint 708 and the overlay network on network substrate 702. In addition, VMM 712A may request a policy evaluation for the source and/or target of the network packet from access control service 730 to determine if client resource instance 714A is allowed to open communications with endpoint 708. For example, access control service 730 may evaluate the policy evaluation request to determine if resource instance 714A is in a role. For example, client resource instance 714A may have assumed role A as indicated in FIG. 5A. Once access control service 730 determines a role for resource instance 714A, the service 730 may evaluate the request according to the policy for the role. Note that endpoint 708 may also have a policy associated with it, and in evaluating a connection request from client resource instance 714A to endpoint 708 to determine if the connection is allowed the policy for endpoint 708 may also be considered. If the access control service 730 determines that the policy allows the connection from resource instance 714A to endpoint 708 via network device 704, then the VMM 712A is notified that the connection is allowed. The VMM 712A may then open a path 706 over network substrate 702 to network device 704 and begin to encapsulate network packet(s) from resource instance 714A and send the encapsulation packets to network device 704 via the path 706. At network device 704, the network packets are de-encapsulated and sent as a network protocol data flow to endpoint 708. For some network protocols, network device 708 may establish a network protocol connection (e.g., a TCP connection) to endpoint over which network protocol traffic may flow. If the access control service 630 determines that the policy(s) deny the connection, in at least some embodiments, VMM 712A simply drops the network packet(s) from resource instance 714A and does not inform resource instance 714A that the connection was not allowed.

The above describes evaluating policy for connections initiated from a source (client resource instance 714A) on a client virtual private network 710 via an overlay network on network substrate 702 to a target (endpoint 708) external to the client virtual private network 710. However, embodiments of the methods and apparatus for providing access control may also be applied when an endpoint 708 external to the client virtual private network 710 is the source, and a client resource instance 714 is the target. The endpoint 708 may, for example, be on another virtual private network of provider network 700, or may be an endpoint external to the provider network 700. The endpoint 708's network packet(s) may be received at a network device 704 coupled to network substrate 702. In at least some embodiments, the endpoint 708 and the network device 704 may utilize an in-band network security protocol to establish an identity for the endpoint 708 on the provider network 700. For example, in at least some embodiments, a network protocol according to Generic Security Service Application Program Interface (GSSAPI, also GSS-API) may be used to establish a secure identify for the endpoint 708 on provider network 700. The network device 704 may then use the endpoint 708's established identity and/or the identity of the target (resource instance 714A) to determine and evaluate policy for opening a connection between the endpoint 708 and the target (resource instance 714A) over the overlay network on network substrate 702. If the connection is not allowed according to the policy, then the network packets may be dropped. If the connection is allowed, then the network device 704 may encapsulate the network packets according to the encapsulation protocol and send the encapsulation packets via path 706 over the network substrate 702 to VMM 712A. At VMM 712A, the network packets are de-encapsulated for delivery to the target resource instance 714A.

Figure 8:
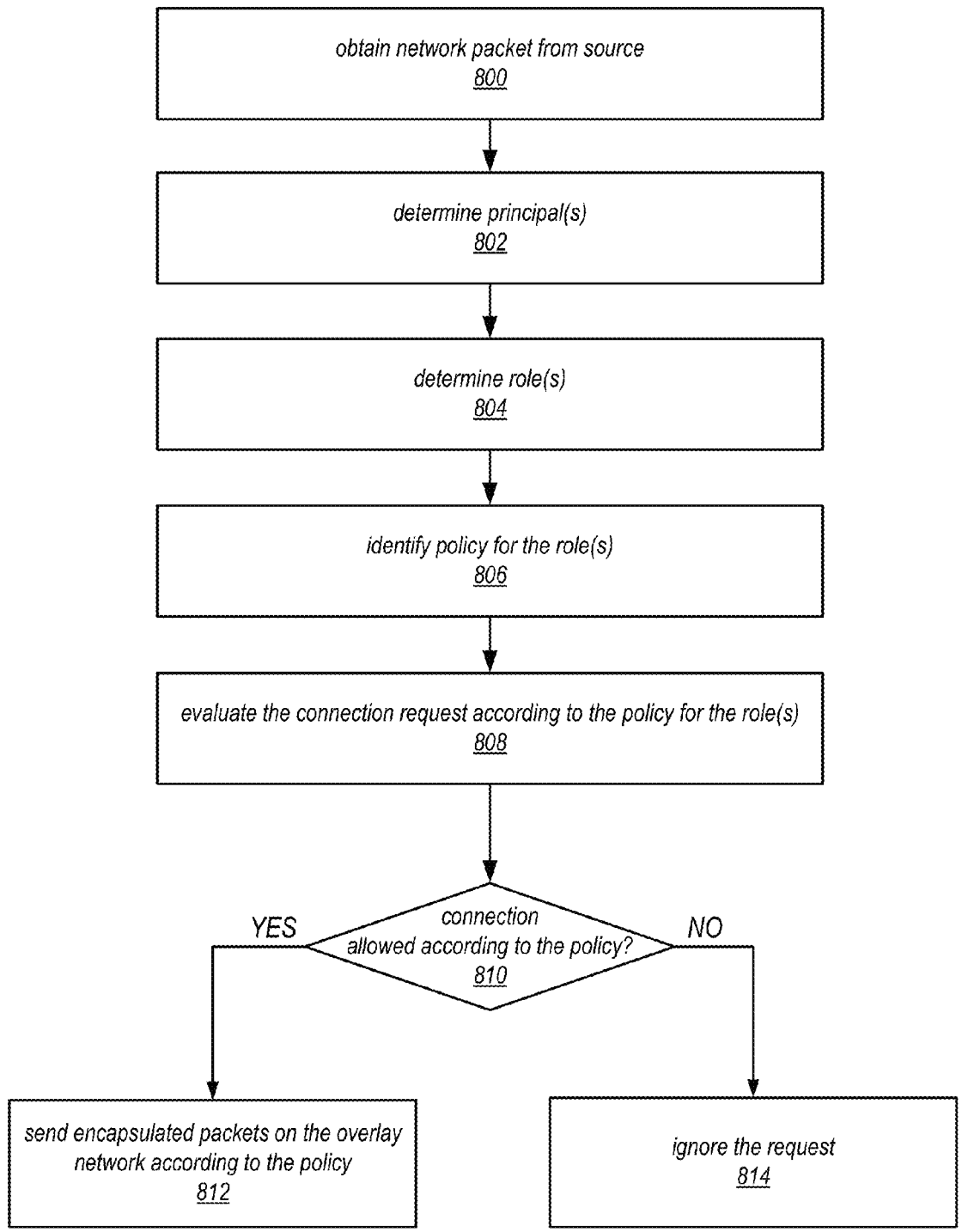
FIG. 8 is a flowchart of an access control method for overlay network connections in which principals assume roles, roles have policies, and access is allowed or denied based upon evaluation of the policies for the roles, according to at least some embodiments.

FIG. 8 is a flowchart of an access control method for overlay network connections in which principals assume roles, roles have policies, and access is allowed or denied based upon evaluation of the policies for the roles, according to at least some embodiments. The access control method may, for example, be performed by encapsulation layer processes on a provider network that use an access control service for policy evaluations, for example by virtual machine monitors (VMMs) on host systems that each front one or more client resource instances (VMs) on the respective host systems. An example access control service is illustrated in FIGS. 2 and 3 and described in the section titled Access control service. Note that each VM on a provider network may be provided with one or more private IP addresses, and the VMM on the respective host system may be aware of the private IP addresses of the VMs on the host.

As indicated at 800, the encapsulation layer process (e.g., a VMM) obtains a network packet from a source (e.g., a client resource instance on the host system). The network packet may indicate a target (which may be, but is not necessarily, another client resource instance on the provider network). In at least some embodiments, the VMM may access a mapping service (or a local cache) to obtain overlay network mapping information for the indicated target. As indicated at 802, an identity of the source may be determined as the principal. For example, the identity may be specified as a resource identifier assigned to the client resource instance by the client as described in the section titled Access control service. In at least some embodiments, in addition to being aware of the private IP addresses of the VMs on the host, the VMM may also be aware of other possible resource identifiers of the client resource instances on the host. In at least some embodiments, an identity for the target may also be determined.

As indicated at 804 a role which the principal has assumed may be determined. As indicated at 806, a policy for the role may be identified. As indicated at 808, the connection request may be evaluated according to the policy. To perform elements 804 through 806, for example, the VMM may communicate information about the principal (e.g., identity information such as one or more resource identifiers of the source resource instance) and the target to an access control service as illustrated in FIG. 3. The access control service may access policies, for example policies for roles that may be assumed by principals and resources as illustrated in FIGS. 4, 5A and 5B, to determine a particular role that the principal (the source resource instance) has assumed. In at least some embodiments, the identity information for the principal that is provided to the access control service may include or may be used to determine an identity of the client associated with the principal. In at least some embodiments, a role for the target may also be determined by the access control service. Once the role(s) of the principal (the source) and/or target are determined, the connection request may be evaluated by the access control service according to the policy of the role(s) to determine if the connection from the source to the target is allowed or denied. FIGS. 4, 5A, and 5B and the section titled Access control service give examples of policies and evaluations that may be performed to determine if a connection is to be allowed from a source to a target. Once the access control service determines whether the connection is allowed or denied, the service informs the encapsulation layer process (e.g., the VMM).

At 810, if the connection is allowed, then the encapsulation layer process (e.g., VMM) may encapsulate the network packet(s) received from the source (e.g., a source resource instance in a client's virtual private network) and send the encapsulated packets on the overlay network to an encapsulation layer destination (e.g., another VMM), as indicated at 812. At the destination, the network packet(s) may be removed from the encapsulation packets and sent to the target (e.g., a target resource instance in the client's virtual private network). At 810, if the connection is denied, then the network packet(s) may be dropped by the encapsulation layer process. However, in some embodiments, denied connection requests may be logged for reporting purposes.

In at least some embodiments, elements 802 through 812 may only be performed for a first network packet in a given packet flow between a source and a target. Subsequent network packets in the given packet flow may be sent to the target via the overlay network encapsulation protocol as indicated at 812 without performing a policy evaluation. In addition, in some embodiments, information about policy evaluations received from an access control service may be locally cached, e.g. at a VMM, and used in future policy evaluations.

While the method of FIG. 8 is directed to an access control method for overlay network connections in which principals assume roles, roles have policies, and access is allowed or denied based upon evaluation of the policies for the roles, note that policies may be associated with other types of principals (e.g., users, groups, etc.) and/or with other types of resource identifiers (names, metadata tags, account identifiers, IP addresses, etc.), and that a similar method may be applied using these policies rather than (or in addition to) policies for roles.

Process Level Identity and Access Control

The above primarily describes access control methods and apparatus that are implemented at the encapsulation layer, for example by virtual machine monitors (VMMs) on host devices that monitor virtual machines (VMs) on the respective host devices. However, some embodiments of access control methods and apparatus may be extended to support operating system process level identity and access management based access control on the virtual machines, and thus at the client or user process level rather than at the encapsulation layer (the VMMs). As mentioned, the VMs implement client resource instances. A client resource instance may be implemented according to any of various operating system technologies according to the needs or requirements of the respective client's virtual private network implementation on the provider network. In at least some embodiments, to extend access control methods to the client or user process level, an agent process (or daemon or device driver) may be implemented at the operating system level on the VMs. The agent may facilitate mapping identities (principals, or more generally resource identifiers) from and to the process level on the VMs, and may facilitate communicating with an access control service as described herein to allow or deny connections at the process level on the VMs according to policies for the process level resources.

Tagging Encapsulation Packets with Identity Information

In at least some embodiments, an encapsulation layer process (e.g., a VMM on a host system) that encapsulates network packets from sources (e.g., VMs on a host system) for routing via the overlay network to target endpoints has or can obtain identity information about the processes (e.g., operating systems or applications on VMs) that are the sources of the network packets. In at least some embodiments, in addition to or instead of determining if a connection from a source (e.g., a VM) to a target endpoint over the overlay network is to be allowed or denied based on an evaluation of related policy as described herein, the encapsulation layer process (e.g., a VMM) may embed or attach identity-related information for the source as metadata to the encapsulation packets. The identity-related information may, for example, include one or more of principal information, role information, group information, and so on, for the respective source endpoint. The identity-related information may also include security/authentication information such as a cryptographic signature based on, for example, a shared secret that may be used, for example, to authenticate the identity information. Tagging the encapsulation packets with identity-related information relevant to policy decisions may provide more context for the target when making policy decisions about connections, and may allow the target to make policy decisions about connections using the provided information without having to retrieve the information from other sources such as databases.

As an example of how the identity-related information with which encapsulation packets are tagged may be used, the target, or an encapsulation layer process at the target, may use the identity-related information in received encapsulation packets to make access decisions based on policies, even in cases where a connection from the source to the target endpoint is allowed based on a source-side policy evaluation. For example, the target endpoint that the source of a network packet wants to access may be virtualized storage provided via a storage virtualization service on the provider network as illustrated in FIGS. 10 and 11. The storage virtualization service may use the identity-related information with which an encapsulation packet is tagged to perform a policy evaluation based on the identity of the source to determine if the source is allowed or disallowed access to a particular storage resource based on the identity of the source, even in cases where the source (e.g., an operating system or application on a client's resource instance) is not aware of the access control method, signing its requests, and so on.

As another example of how the identity-related information with which encapsulation packets are tagged may be used, for connection-oriented network protocols such as TCP, the source-side encapsulation layer process (e.g., a VMM) may tag the encapsulation packets with the identity information and participate in an authentication exchange, for example according to Generic Security Service Application Program Interface (GSSAPI), with the target endpoint on behalf of the source without the source's knowledge or direct participation.

Caching Policy Information

Embodiments of access control methods and apparatus have primarily been described in which an encapsulation layer process (e.g., a VMM) on a device (e.g. a host device) in a provider network accesses an access control service implemented on one or more devices on the provider network for policy evaluations. In some embodiments, instead of or in addition to accessing an access control service for policy evaluations, a device may maintain a local cache of policy information. The encapsulation layer process or another process on the device may be configured to locally perform at least some policy evaluations according to the local cache of policy information. In some embodiments, the encapsulation layer process may be configured to check the local cache of policy information to determine if a connection request from a principal can be locally evaluated according to cached policies and, if so, perform the local policy evaluation. If the policy evaluation cannot be locally performed according to the local cache, then the access control service may be accessed to perform the evaluation.

Example Provider Network Environments

This section describes example provider network environments in which embodiments of access control methods and apparatus as described herein may be implemented. However, these example provider network environments are not intended to be limiting.

Figure 9:
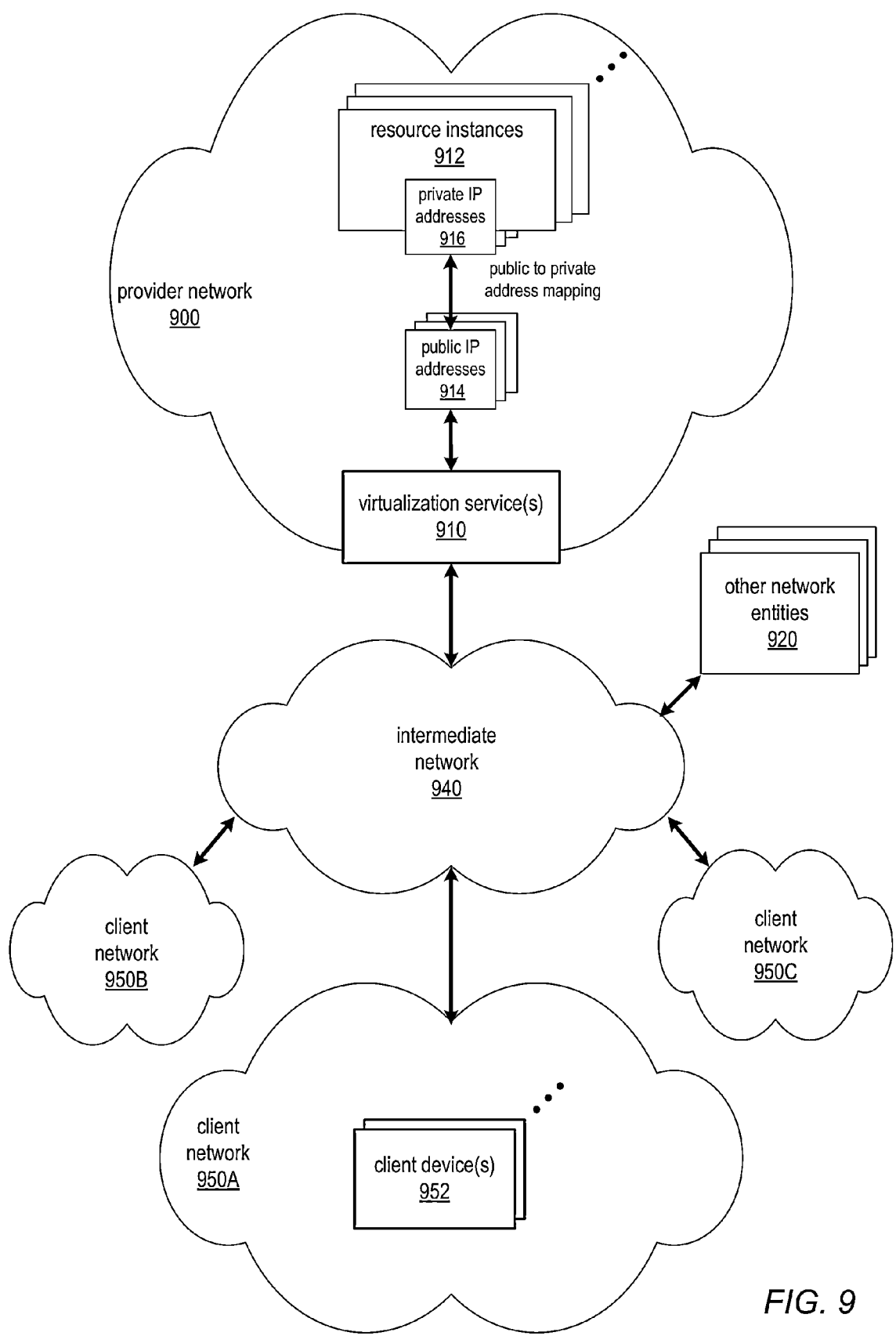
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Network traffic originating outside the provider network is not directly routed to private IP addresses; instead, the traffic uses public IP addresses that are mapped to the private IP addresses of the resource instances. The provider network may include network devices or appliances that provide network address translation (NAT) or similar functionality to perform the mapping from public IP addresses to private IP addresses and vice versa. Note that a given private IP address as used herein is not necessarily mapped to a public IP address.

Public IP addresses, as used herein, are Internet routable network addresses of the provider network that are assigned to resource instances on the provider network, either by the service provider or by the client. Traffic routed to a public IP address of the provider network may be translated, for example via 1:1 network address translation (NAT), and forwarded to the respective private IP address of a resource instance on the provider network. Note that private IP addresses as used herein may generally be, but are not necessarily, non-Internet routable IP addresses (e.g., RFC 1918 addresses) that are, for example, only routable within the provider network or a subnetwork thereof, or within a client's virtual private network implementation on the provider network. However, in some implementations, the private IP addresses may be Internet routable addresses. In other words, a client may use Internet routable addresses or non-routable addresses for the client's resource instances on the provider network and within the client's virtual private network implementation on the provider network.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map substrate IP addresses of network packets to IP overlay addresses, encapsulate the network packets according to an encapsulation protocol, and deliver the encapsulated packets to the correct endpoints via overlay network tunnels. At the endpoints, the encapsulation is stripped from the packets. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective virtual private network on the provider network 1100 via an API 1102 to request allocation of one or more resource instances within the virtual private network or within another virtual private network.

FIG. 12 illustrates an example provider network that provides virtual private networks on the provider network to at least some clients, according to at least some embodiments. A client's virtual private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtual private network 1260 may be connected to a client network 1250 via a private communications channel 1242. A private communications channel 1242 may, for example, be a tunnel implemented according to a network tunneling technology or some other peering connection over an intermediate network 1240. The intermediate network may, for example, be a shared network or a public network such as the Internet. Alternatively, a private communications channel 1242 may be implemented over a direct, dedicated connection between virtual private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtual private network 1260 for a client on provider network 1200, one or more resource instances (e.g., VMs 1224A and 1224B and storage 1218A and 1218B) may be allocated to the virtual private network 1260. Note that other resource instances (e.g., storage 1218C and VMs 1224C) may remain available on the provider network 1200 for other client usage. A range of public IP addresses may also be allocated to the virtual private network 1260. In addition, one or more networking devices (routers, switches, etc.) of the provider network 1200 may be allocated to the virtual private network 1260. A private communications channel 1242 may be established between a private gateway 1262 at virtual private network 1260 and a gateway 1256 at client network 1250.

In at least some embodiments, in addition to, or instead of, a private gateway 1262, virtual private network 1260 may include a public gateway 1264 that enables resources within virtual private network 1260 to communicate directly with entities (e.g., network entity 1244) via intermediate network 1240, and vice versa, instead of or in addition to via private communications channel 1242.

Virtual private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtual private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtual private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and groups in an example virtual private network implementation on a provider network, according to at least some embodiments. In at least some embodiments, a provider network such as provider network 1200 in FIG. 12 may allow the client to establish and manage virtual groups 1316 within the client's virtual private network 1310, within or across subnets 1314. In at least some embodiments, a group 1316 may, for example, act as a firewall that controls the traffic allowed to reach one or more resource instances 1318 within the group 1316. The client may establish one or more groups 1316 within the private network 1310, and may associate each resource instance 1318 in the private network 1310 with one or more of the groups 1316. In at least some embodiments, the client may establish and/or modify rules for each group 1316 that control the inbound traffic allowed to reach the resource instances 1318 associated with the group 1316.

In the example virtual private network 1310 shown in FIG. 13, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In the example shown in FIG. 13, resource instances 1318A through 1318E are on subnet 1314A, and resource instances 1318F through 1318J are on subnet 1314B. The client has established four groups 1316A through 1316D. As shown in FIG. 13, a group may extend across subnets 1314, as does group 1316A that includes resource instances 1318A and 1318B on subnet 1314A and resource instance 1318F on subnet 1314B. In addition, a resource instance 1318 may be included in two or more groups 1316, as is resource instance 1318A which is included in group 1316A and 1316B.

Illustrative System

In at least some embodiments, a server that implements a portion or all of the access control methods and apparatus as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for access control, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of an access control method. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A provider network, comprising:
   a network substrate;
   one or more computing devices implementing an access control service configured to manage and evaluate policies on the provider network; and
   a plurality of host devices, wherein each host device implements one or more resource instances;
   wherein one or more of the host devices are each configured to:
      obtain a network packet from a resource instance on the respective host device;
      communicate with the access control service to determine whether the resource instance is or is not allowed to open a connection to a target indicated by the network packet according to an evaluation of a policy associated with the resource instance performed by the service;
      if the resource instance is allowed to open a connection to a target indicated by the network packet according to the policy, send one or more network packets from the resource instance to the target via an overlay network path over the network substrate; and
      if the resource instance is not allowed to open a connection to a target indicated by the network packet according to the policy, discard the network packet without sending the network packet to the target.

2. The provider network as recited in claim 1, wherein the target is another resource instance on the provider network or an endpoint on another network.

3. The provider network as recited in claim 1, wherein the resource instance and the target are both resource instances in a private network implementation of a particular client on the provider network.

4. The provider network as recited in claim 1, wherein, to determine whether the resource instance is or is not allowed to open a connection to a target indicated by the network packet, the access control service is further configured to determine and evaluate a policy associated with the target, wherein the resource instance is only allowed to open a connection to the target if both the policy associated with the resource instance and the policy associated with the target allow the connection.

5. The provider network as recited in claim 1, wherein the resource instances are implemented as virtual machines (VMs) on the host devices, wherein each host device includes a virtual machine monitor (VMM) that monitors a plurality of virtual machines (VMs) on the respective host device, and wherein the VMMs on the host devices perform said obtaining, said accessing, and said sending.

6. The provider network as recited in claim 1, wherein, to evaluate the policy associated with the resource instance, the access control service is configured to:
determine that the resource instance has assumed a role in a private network implementation of a particular client on the provider network;
determine a policy associated with the role which the resource instance has assumed; and
evaluate the policy associated with the role.

7. The provider network as recited in claim 1, wherein, to send the one or more network packets from the resource instance to the target via an overlay network path over the network substrate, the host device is configured to:
encapsulate the one or more network packets according to an encapsulation protocol to generate one or more encapsulation packets; and
send the encapsulation packets onto the network substrate to be routed to the target according to routing information in the encapsulation packets.

8. The provider network as recited in claim 1, further comprising one or more network devices configured to:
communicate with an endpoint external to an overlay network implemented on the network substrate to establish an identity for the endpoint on the overlay network;
access the access control service to determine that the endpoint is allowed to open a connection to a target resource instance via the overlay network according to an evaluation of a policy associated with the target resource instance; and
in response to said determining, send one or more network packets from the endpoint to the target resource instance via an overlay network path over the network substrate.

9. A method, comprising:
obtaining, by an encapsulation layer process implemented on a host device in a provider network, a network packet from one of one or more resource instances implemented on the host device, wherein the network packet is directed to a target endpoint;
determining that the resource instance is identified as a principal according to an identity and access management environment on the provider network;
determining that the principal is allowed to open a connection to the target endpoint according an evaluation of a policy associated with the principal; and
in response to said determining that the principal is allowed to open a connection to the target endpoint:
encapsulating one or more network packets from the resource instance and directed to the target endpoint according to an encapsulation protocol to generate one or more encapsulation packets; and
sending the one or more encapsulation packets onto a network substrate of the provider network to be routed to the target endpoint according to routing information in the encapsulation packets.

10. The method as recited in claim 9, wherein the target endpoint is another resource on the provider network or an endpoint on another network.

11. The method as recited in claim 9, wherein the resource instance and the target endpoint are both resource instances in a private network implementation of a particular client on the provider network.

12. The method as recited in claim 9, wherein said determining that the principal is allowed to open a connection to the target endpoint according an evaluation of a permission statement of a policy associated with the principal comprises:
the encapsulation layer process sending a policy evaluation request to an access control service on the provider network;
determining, by the access control service, the policy associated with the principal;
evaluating, by the access control service, one or more permission statements in the policy associated with the principal to determine that the policy allows the principal to open connections to a resource associated with the target endpoint; and
indicating to the encapsulation layer process that the principal is allowed to open connections to the target endpoint.

13. The method as recited in claim 12, wherein the access control service further performs determining and evaluating a policy associated with the resource associated with the target endpoint, wherein the principal is only allowed to open a connection to the resource if both the policy associated with the principal and the policy associated with the resource allow the connection.

14. The method as recited in claim 12, wherein each permission statement in the policy associated with the principal indicates one or more actions for which permission is to be allowed or denied, one or more resources to which the permission statement applies, and whether the indicated one or more actions are allowed or denied for the indicated one or more resources.

15. The method as recited in claim 9, further comprising:
obtaining, by the encapsulation layer process, another network packet from a resource instance identified as the principal according to the identity and access management environment, wherein the other network packet is directed to another target endpoint;
determining that the principal is not allowed to open a connection to the other target endpoint according to an evaluation of a policy associated with the principal; and
in response to said determining, discarding the other network packet without sending the network packet to the other target endpoint.

16. The method as recited in claim 9, wherein said determining that the principal is allowed to open a connection to the target endpoint according an evaluation of a policy associated with the principal comprises:
- determining that the principal has assumed a role in a private network implementation of a particular client on the provider network, wherein the policy associated with the principal is a policy associated with the role that the principal has assumed; and
- evaluating the policy associated with the role to determine that the principal is allowed to open a connection to the target endpoint.

17. A non-transitory computer-accessible storage medium storing program instructions computer-executable to implement an encapsulation layer process on a device in a provider network, the encapsulation layer process configured to:
- obtain a network packet from a source endpoint, wherein the network packet is directed to a target endpoint;
- determine a resource identifier for the source endpoint and a resource identifier for the target endpoint;
- determine a policy associated with the resource identifier for the source endpoint and a policy associated with the resource identifier for the target endpoint;
- determine that the source endpoint is allowed to open a connection to the target endpoint according to an evaluation of one or both of the policy associated with the resource identifier for the source endpoint and the policy associated with the resource identifier for the target endpoint; and
- in response to said determining that the source endpoint is allowed to open a connection to the target endpoint:
  - tag one or more network packets from the source endpoint and directed to the target endpoint with encapsulation metadata according to an encapsulation protocol to generate one or more encapsulation packets; and
  - send the encapsulation packets onto a network substrate of the provider network to be routed to the target endpoint according to the encapsulation metadata in the encapsulation packets.

18. The non-transitory computer-accessible storage medium as recited in claim 17, wherein, to determine that the source endpoint is allowed to open a connection to the target endpoint according to an evaluation of one or both of the policy associated with the resource identifier for the source endpoint and the policy associated with the resource identifier for the target endpoint, the encapsulation layer process is configured to:
- evaluate the policy associated with the resource identifier for the source endpoint to determine that the policy allows the source endpoint to open connections to the resource identifier associated with the target endpoint; and
- evaluate the policy associated with the resource identifier for the target endpoint to determine that the policy allows the target endpoint to accept connections from the resource identifier associated with the source endpoint.

19. The non-transitory computer-accessible storage medium as recited in claim 17, wherein the encapsulation layer process is further configured to include identity-related information for the source endpoint as metadata in at least one of the one or more encapsulation packets, wherein the identity-related information for the source endpoint is configured to be used at the target endpoint to make access decisions for the source endpoint according to policy at the target endpoint.

20. The non-transitory computer-accessible storage medium as recited in claim 17, wherein the source endpoint is external to the provider network, wherein the target endpoint is a resource instance on the provider network, and wherein, to determine a resource identifier for the source endpoint, the encapsulation layer process is configured to communicate with the source endpoint to establish a secure identity for the source endpoint on the provider network.

* * * * *